(12) United States Patent
Covic et al.

(10) Patent No.: US 10,878,995 B2
(45) Date of Patent: Dec. 29, 2020

(54) FLUX COUPLING DEVICE AND MAGNETIC STRUCTURES THEREFOR

(71) Applicant: Auckland Uniservices Limited, Auckland (NZ)

(72) Inventors: Grant Anthony Covic, Mount Albert (NZ); Mickel Bipin Budhia, Green Bay (NZ)

(73) Assignee: Auckland UniServices Limited, Auckland (NZ)

( * ) Notice: Subject to any disclaimer, the term of this patent is extended or adjusted under 35 U.S.C. 154(b) by 384 days.

(21) Appl. No.: 14/410,817

(22) PCT Filed: Jul. 9, 2013

(86) PCT No.: PCT/NZ2013/000120
§ 371 (c)(1),
(2) Date: Dec. 23, 2014

(87) PCT Pub. No.: WO2014/011059
PCT Pub. Date: Jan. 16, 2014

(65) Prior Publication Data
US 2015/0170832 A1    Jun. 18, 2015

(30) Foreign Application Priority Data
Jul. 9, 2012 (NZ) ........................................ 601154

(51) Int. Cl.
*H01F 38/00* (2006.01)
*H01F 38/14* (2006.01)
(Continued)

(52) U.S. Cl.
CPC .............. *H01F 38/14* (2013.01); *B60L 53/12* (2019.02); *H01F 27/365* (2013.01); *H01F 27/38* (2013.01);
(Continued)

(58) Field of Classification Search
USPC .......................................................... 307/104
See application file for complete search history.

(56) References Cited

U.S. PATENT DOCUMENTS

| 4,873,677 A | 10/1989 | Sakamoto et al. |
| 7,804,272 B2 | 9/2010 | Morita et al. |
| (Continued) | | |

FOREIGN PATENT DOCUMENTS

| CN | 101563598 A | 10/2009 |
| CN | 101636800 A | 1/2010 |
| (Continued) | | |

OTHER PUBLICATIONS

"European Application No. 13843553.2, Extended European Search Report dated Apr. 26, 2016", (Apr. 26, 2016), 7 pgs.

(Continued)

*Primary Examiner* — Rexford N Barnie
*Assistant Examiner* — Dru Parries
(74) *Attorney, Agent, or Firm* — Schwegman Lundberg & Woessner, P.A.

(57) ABSTRACT

A magnetic flux coupler comprising a magnetically permeable core having a first axis, two coils magnetically associated with the core, each coil defining a pole area located on a first side of the core and the pole areas being separated along the first axis, the coils each having a central region located between the pole areas, an end region opposite to the central region, and a side region between the central region and the end region, wherein an auxiliary pole area is provided beyond the end region of each coil which absorbs leakage flux which would otherwise emanate from the each coil in use in the vicinity of the end region.

18 Claims, 36 Drawing Sheets
(5 of 36 Drawing Sheet(s) Filed in Color)

(51) Int. Cl.

| | |
|---|---|
| *H01F 27/38* | (2006.01) |
| *H01F 27/36* | (2006.01) |
| *B60L 53/12* | (2019.01) |
| *H01F 27/34* | (2006.01) |
| *H02J 50/10* | (2016.01) |

(52) U.S. Cl.
CPC .............. *H01F 27/346* (2013.01); *H02J 50/10* (2016.02); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 7,880,337 | B2 | 2/2011 | Farkas |
| 8,264,220 | B2 | 9/2012 | Gleich et al. |
| 8,360,655 | B2 | 1/2013 | Dobbs |
| 2008/0129246 | A1 | 6/2008 | Morita et al. |
| 2012/0025602 | A1* | 2/2012 | Boys ................ H02J 5/005 307/9.1 |
| 2012/0235507 | A1 | 9/2012 | Choi et al. |
| 2015/0380157 | A1 | 12/2015 | Green et al. |

FOREIGN PATENT DOCUMENTS

| | | |
|---|---|---|
| CN | 102362406 A | 2/2012 |
| JP | 2008-120239 A | 5/2008 |
| WO | WO-2008/140333 | 11/2008 |
| WO | WO-2010/090538 | 8/2010 |
| WO | WO-2010/090539 A1 | 8/2010 |
| WO | WO-2011/016736 A2 | 2/2011 |
| WO | WO-2011/016737 A1 | 2/2011 |
| WO | WO-2011016736 A2 * | 2/2011 ............. H02J 50/70 |
| WO | WO-2014/011059 | 1/2014 |
| WO | WO-2014/122121 A1 | 8/2014 |
| WO | WO-2014/122125 A1 | 8/2014 |

OTHER PUBLICATIONS

Li, Hao Leo, "High Frequency Power Converters Based on Energy Injection Control for IPT Systems", A thesis submitted in partial fulfillment of the requirements for the degree of Doctor of Philosophy in Engineering, Department of Electrical and Computer Engineering, The University of Auckland, Jan. 1, 2011, retrieved from internet Mar. 15, 2016, (Jan. 1, 2011), 216 pgs.

"International Application No. PCT/NZ2013/000120, International Search Report and Written Opinion dated Nov. 1, 2013", (Nov. 1, 2013), 17 pgs.

"Chinese Application Serial No. 201380046716.9, Chinese First Office Action dated Jul. 4, 2016", (w/ English Translation). 20 pgs.

"Chinese Application Serial No. 201380046716.9, Chinese Second Office Action dated Apr. 27, 2017", (w/ English Translation), 18 pgs.

"Chinese Application Serial No. 201380046716.9, Chinese Third Office Action dated Jan. 4, 2018", (w/ English Translation), 21 pgs.

"European Application Serial No. 13816491.8, Office Action dated May 16, 2019", 9 pgs.

"Japanese Application Serial No. 2015-521574, Office Action dated Jul. 11, 2017", (w/ English Translation), 10 pgs.

Covic, Grant A., et al., "A Bipolar Primary Pad Topology for EV Stationary Charging and Highway Power by Inductive Coupling", *IEEE Energy Conversion Congress and Exposition (ECCE)*, (2011), 1832-1838.

* cited by examiner

Magnetic flux density in the xz and yx planes.

Flux density

Flux density (a)

(b)

(a)

(b)

(a)

(b)

(a)

(b)

(a)

(b)

(a)

(b)

(c)

(d)

(a)

(b)

(a)

(b)

FLUX COUPLING DEVICE AND MAGNETIC STRUCTURES THEREFOR

PRIORITY CLAIM TO RELATED APPLICATIONS

This application is a U.S. national stage application filed under 35 U.S.C. § 371 from International Application Serial No. PCT/NZ2013/000120, which was filed Jul. 9, 2013, and published as WO 2014/011059 on Jan. 16, 2014, and which claims priority to New Zealand Application No. 601154, filed Jul. 9, 2012, which applications and publication are incorporated by reference as if reproduced herein and made a part hereof in their entirety, and the benefit of priority of each of which is claimed herein.

FIELD OF THE INVENTION

This invention relates to apparatus for producing or receiving magnetic flux. The invention has particular, but not sole, application to wireless power transfer using an inductive power transfer (IPT) system.

BACKGROUND

IPT systems, and the use of a coupling device in the form of a pad which includes one or more windings that may comprise the primary or secondary windings for inductive power transfer, are described in our published international patent application WO 2008/14033, the contents of which are incorporated herein by reference.

One particular application of IPT power transfer pads is electric vehicle charging, and that application is discussed in this section to provide the background to one application of the invention. However, electric vehicle charging is an example of only one application, and the invention has application to inductive power transfer in general. Electric vehicle charging may occur while the vehicle is stationary, or alternatively while the vehicle is moving along a roadway, for example. IPT power transfer pads can be used both in the vehicle as a power "pickup" (i.e. the secondary side winding of the IPT system), and at a stationary location such as a garage floor or a roadway for example as the "charging pad" (i.e. the primary side winding) from which power is sourced.

The purpose of an IPT roadway system is to wirelessly transfer power to a stationary or moving vehicle without physical contact with the vehicle. The transmitting part of the system consists of a power supply supplying a lumped coil (for example a pad as described above), or a track with many similar lumped coils, where such a system is tuned for operation at a suitable frequency, usually anywhere from 10 kHz to 150 kHz. the receiver is placed underneath a vehicle and coupled to receive power either when the vehicle is stationary above or near (in sufficiently close proximity to couple power) to the primary transmitter. The pickup receiver also typically comprises a lumped coil (such as a pad described above) which is connected to a converter and appropriate controller within the vehicle to regulate power. For convenience, the part of a roadway from which power may be received inductively is referred to herein as a track.

The track may be formed by placing a plurality of pads along the centre of a lane in a roadway. This results in the possibility of an essentially continuous supply of power to the vehicle as it moves along the roadway in the immediate vicinity of the track.

In recent years such systems have received increasing attention due to their potential to allow sustainable wireless powered personal transportation. For such a system to be useful it must not only be able to transfer sufficient power over an air gap of reasonable size (e.g. 100-300 mm) it must also prove tolerant to any displacements between track and pickup, to avoid dependency on a vehicle-to-track guidance systems. In a roadway system such displacement will most likely occur in the lateral direction (orthogonal to both vertical and the direction of movement) for moving vehicles. For stationary vehicle charging the ability to transfer acceptable levels of power with suitable longitudinal displacement is of particular concern in order to ensure ease of parking. The power transfer profile in the pick-up pad is ideally a smooth power profile which is essentially constant (and sufficient) over as wide as possible a distance laterally, with smooth drop-offs at each end. Such a power transfer profile eases the demands on the electronic (primary and secondary) regulators in the system, enabling improved operating performance for a comparable coupling over a system where during operation significant variations are experienced in the coupling between the primary and receiver pads.

In the practical use of flux coupling devices for power transfer in applications such as vehicle charging it is important to reduce stray magnetic fields i.e. leakage flux. In particular, it is desirable to minimise leakage flux without significantly compromising the coupling flux of the pad devices (i.e. the flux which effects power transfer), taking into account likely relative displacements between the devices.

OBJECT

It is an object of the present invention to reduce leakage flux in magnetic flux coupling devices without significantly compromising the coupling of the devices.

It is a further or alternative object of the invention to reduce leakage flux in magnetic coupling devices without significantly compromising the coupling of the devices, taking into account likely relative displacements between the devices.

It is a further or alternative object of the invention to provide an improved coupling device, or to at least provide a useful alternative to known devices.

BRIEF SUMMARY OF THE INVENTION

In one aspect the invention provides a magnetic flux coupler comprising:
a magnetically permeable core having a first axis,
two coils magnetically associated with the core, each coil defining a pole area located on a first side of the core and the pole areas being separated along the first axis,
the coils each having a central region located between the pole areas, an end periphery opposite to the central region, and a side periphery between the central region and the end periphery,
wherein an auxiliary pole area is provided beyond the end periphery of each coil.

In one embodiment the auxiliary pole area comprises a part of the core.

The auxiliary pole area absorbs leakage flux which would otherwise emanate from the each coil in use in the vicinity of the end periphery. The auxiliary pole area may couple flux to another flux coupler apparatus when misaligned along the first axis.

In one embodiment the auxiliary pole area does not extend beyond the side periphery of each coil. It may comprise a surface adjacent to the end periphery. Furthermore, the pole area may define one of a wall, lip or recess.

The core may include one or more recesses to receive the end periphery of each coil. The recess can face toward a region in which coupled flux is directed or received, or face toward the central region.

In one embodiment the end periphery comprises stacked turns of the coil.

The auxiliary pole area may be provided at an angle to a centre of current of the peripheral region. In another embodiment the auxiliary pole area comprises a plurality of pole areas.

In another aspect the invention provides a magnetic flux coupler comprising:

a coil for producing or intercepting magnetic coupling flux;

a magnetically permeable leakage flux absorption means located beyond a peripheral edge portion of the coil so as to absorb leakage flux which would otherwise emanate from the coil in use in the vicinity of the peripheral edge portion.

In another aspect the invention provides an inductive power transfer system comprising a magnetic flux coupler according to any one of the preceding statements.

In another aspect the invention provides a magnetic flux coupler comprising:

a magnetically permeable core having a first axis, two coils magnetically associated with the core, each coil defining a pole area located on a first side of the core and the pole areas being separated along the first axis, the coils each having a central region located between the pole areas, an end region opposite to the central region, and side regions between the central region and the end region, the core having flux channelling means whereby magnetic flux at the end regions is encouraged to enter the core, and magnetic flux at each side region is encouraged to extend to the pole area furthest from that side region.

In another aspect the invention provides a magnetic flux coupler comprising:

a magnetically permeable core having a first axis, two coils magnetically associated with the core, each coil defining a pole area located on a first side of the core and the pole areas being separated along the first axis, the coils each having a central region located between the pole areas, an end periphery opposite to the central region, and a side periphery between the central region and the end periphery, wherein the core extends beyond the end periphery of each coil and does not extend beyond the side periphery of each coil.

In another aspect the invention broadly provides a magnetic flux coupler comprising: a magnetically permeable core having a first end and a second end and a first axis provided therebetween, two coils magnetically associated with the core, each coil defining a pole area located on a first side of the core and the pole areas being separated along the first axis, the first and second ends extending beyond the pole areas, the core having a first cross section transverse to the first axis between the pole areas, the first cross-section having a low reluctance region to encourage magnetic flux to extend between the pole areas in a direction parallel to the first axis, the core having a second cross-section parallel to the first axis at a point beyond the pole areas, the second cross-section having a low reluctance region to encourage magnetic flux adjacent to the ends of the core to enter the core.

In another aspect the invention provides a magnetic flux coupler comprising:

a magnetically permeable core having a first end and a second end and a first axis provided therebetween, two coils magnetically associated with the core, each coil defining a pole area located on a first side of the core and the pole areas being separated along the first axis, the first and second ends extending beyond the pole areas, the core having a cross section transverse to the first axis between the pole areas, the cross-section having a low reluctance region to encourage magnetic flux to extend between the pole areas in a direction parallel to the first axis, and flux channelling means provided transverse to the first axis at or adjacent to each end of the core to encourage magnetic flux adjacent to the ends of the core to enter the core.

The cross section may include a plurality of low reluctance regions separated by a high reluctance region.

The flux channelling means may comprise a length of highly permeable magnetic material having a longitudinal axis transverse to the first axis.

In one embodiment the flux channelling means is joined to the core. Alternatively the flux channelling means is provided adjacent to each end of the core.

In one embodiment the coils overlap.

In another embodiment three coils are provided, one of the coils overlapping the other two coils.

In one embodiment the flux channelling means substantially reduces leakage flux.

In another embodiment the flux channelling means channels flux from another coupler device into the core for which the flux channelling means is provided.

Other aspects of the invention will become apparent from the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 39 (a)-(d) provides contour plots of flux leakage for various combinations of primary and secondary flux coupling apparatuses, with a horizontal displacement therebetween along an x-axis in the;

DETAILED DESCRIPTION OF THE DRAWINGS

Figure 1:
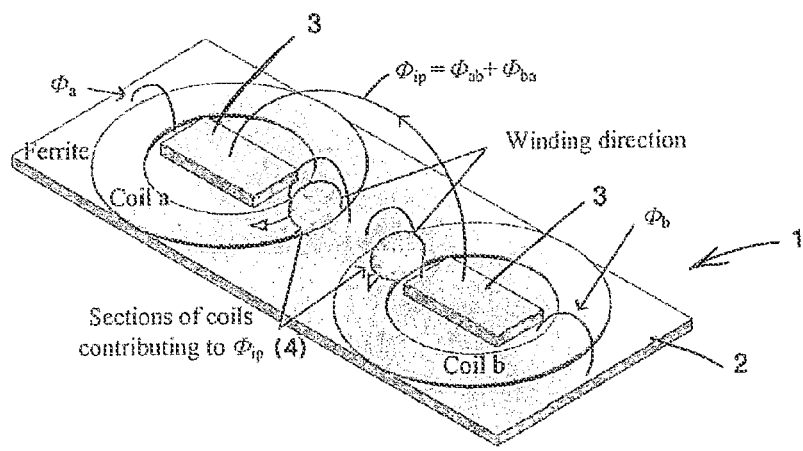
FIG. 1 is a diagrammatic perspective view of one form of coupler apparatus having co-planar coils on a highly magnetically permeable surface made up a ferrite sheet.

Leakage flux tends to occur around the sides and back of coupling devices. A practical method for minimising flux out the back of a coupler is to avoid producing it to begin with. One embodiment of a coupler is shown in FIG. 1 in the form of a pad 1. Coupler structures are referred to herein as "pads" however this term is not intended to be limiting. Pad 1 includes coils which are placed on a magnetically permeable core structure comprising ferrite sheet 2 with raised ferrite blocks 3 at the centre of each coil. The raised blocks 3 are added to improve coupling. Coplanar coils a and b on a ferrite sheet 2 as shown in FIG. 1 do not produce any magnetomotive force (mmf) that can drive flux out the back of the pad. This allows aluminium shielding (not shown) to be placed underneath i.e. on the side opposite the coils (like a circular pad as described in our international patent publication WO2008/140333) creating a truly single sided flux coupler. Ideally shielding is not required on the back of the pad but fringing flux between the individual ferrite pieces that in practice make up the sheet 2 will cause loss in higher resistivity ferromagnetic materials such as steel.

Although the topology shown in FIG. 1 produces a single sided flux, the fundamental flux paths are not ideal and will necessarily result in a low coupling coefficient. The inductance (L) of the FIG. 1 topology is made up of the inductance of each coil, referred to as coil a and coil b in FIG. 1, and the mutual inductance between them because they are connected in parallel (current flows in the winding direction shown in FIG. 1). Inductance is due to flux linkage in a coil (of a certain number of turns) for a given current and therefore it can be described by considering the following fluxes: $\varphi_a$ the flux about coil a, $\varphi_b$ the flux about coil b, $\varphi_{ab}$ the flux in coil a due to coil b and $\varphi_{ba}$ the flux in coil b due to coil a. Fluxes $\varphi_a$ and $\varphi_b$ are shown in FIG. 1.

The mutual flux between the two coils is referred to as the intra-pad flux ($\varphi_{ip}$) and is illustrated by the large arc in FIG. 1. When the pad of FIG. 1 is used as a coupler, a portion of $\varphi_{ip}$ couples to a receiver pad, thereby transferring power. Thus intra-pad flux $\varphi_{ip}$ should be relatively large. An effective measure for quantifying coupling between the coils is the intra-pad coupling coefficient ($k_{ip}$) which is the ratio of the mutual inductance between the coils to the total flux produced by the coils. In the FIG. 1 embodiment, $\varphi_{ip}$ is necessarily small due to the physical separation between the coils, and because the section of coil that contributes to $\varphi_{ip}$ is small (as shown by the shaded regions 4 in FIG. 1). This will result in a very low coupling coefficient between a a coupler that generates flux and one that receives the flux. These reasons indicate that although the pad topology of FIG. 1 exhibits useful features, it is not suitable for IPT charging systems due to the lower overall coupling than desired.

Simulation Model With Shaped Coils

Figure 2:
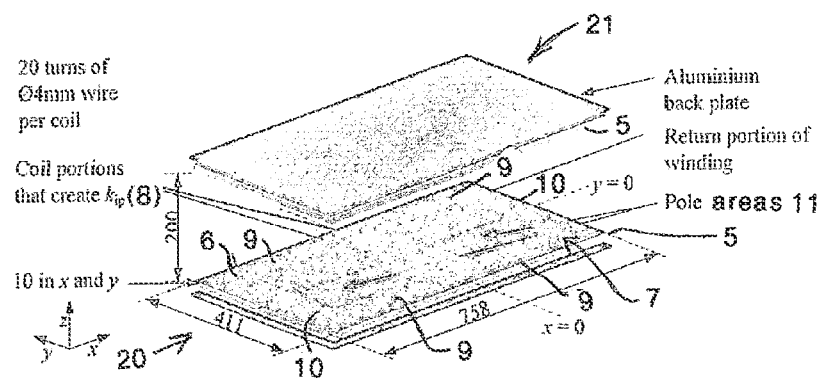
FIG. 2 is a diagrammatic perspective view of another form of coupler apparatus having an improved form of magnetically permeable surface, showing both a flux "transmission" device and a "reception" device as used in a simulation model of a power transfer system.

The intra-pad coupling coefficient of the surface 2 of the FIG. 1 topology can be increased by making the coils square and moving them closer to each other, forming a distinct midsection about the x axis as shown in FIG. 2. Referring now to FIG. 2, a simulation model comprising identical coupling pads 20 and 21 was made to investigate coupling performance. Core structures comprising ferrite sheets 5 measuring 758 mm long (x-axis)×411 mm wide (y-axis)×16 mm deep (z-axis) were used as shown in FIG. 2. Each coil 6, 7 consists of 20 turns of 4 mm diameter wire, made square to simplify the model. The ferrite sheet 5 extends past the end and side periphery of the coils by 10 mm in the x and y-axes. The pole areas 11 are separated along the x axis. The sides 8 of each coil that are in the centre of the pad between the pole areas 11 comprise a central region of each coil. The central regions share a common boundary at x=0 and therefore contribute to the intra-pad coupling coefficient. The remaining three sides of each coil are considered the return portions as they do not contribute to $k_{ip}$—two sides 9 (side regions) are perpendicular to the midsection and the remaining side 10 (the end or peripheral region of each coil) is far away, being opposite to the central region and the current direction is opposing. The inner areas 11 of both coils are referred to as the pole areas as the inter-pad flux (between one of the pads 20 and 21 and the other of the pads) passes through these areas. Pole areas 11 in the FIG. 2 embodiment are not raised, to thereby reduce the vertical profile of each pad.

The results of a simulation with an air gap of 200 mm between pads 20 and 21 are summarised in Table 1 where the left column contains data that relates to the inter-pad coupling (between pad 20 and pad 21) and the right contains data for the intra-pad coupling (between the coils 6 and 7 of each pad). Both the pads 20 and 21 are identical and therefore have the same self-inductance of 789 µH ($L_1=L_2=L$ (pad)).

Note in the simulation the coils are wound with one wire but in practice a bifilar winding would be used to lower the inductance and in order to maintain the same ampere-turns (NI) in the transmitter, $I_1$ needs to be doubled. The coupling coefficient of 0.215 enables an uncompensated power of 2.4 kVA, which is far higher than that possible with similar sized circular and flux pipe pads.

The intra-pad coupling coefficient of the FIG. 2 embodiment is 0.154 and this is lower than the k between pads indicating that the majority of the coupling is not due to flux on the fundamental flux path (shown in as $\varphi_{ip}$ in FIG. 1). A significant proportion of the coupling coefficient between pads is due to the return portions (i.e. sides 9 and 10) of each coil making the core structures 5 act like two coupled circular pads of WO2008/140333 aligned on the z axis and placed close to each other.

TABLE 1

PAD PARAMETERS AND INTRA-PAD COUPLING OF MODIFIED STRUCTURE

| | | | |
|---|---|---|---|
| $V_{oc}$ | 489 V | L (coil) | 341 µH |
| $I_{sc}$ | 4.84 A | $M_{ip}$ | 52.6 µH |
| $P_{su}$ | 2418 VA | $k_{ip}$ | 0.154 |
| M | 169 µH | | |
| L (pad) | 789 µH | | |
| k | 0.215 | | $I_1$ = 23A at 20 kHz |

Figure 3:
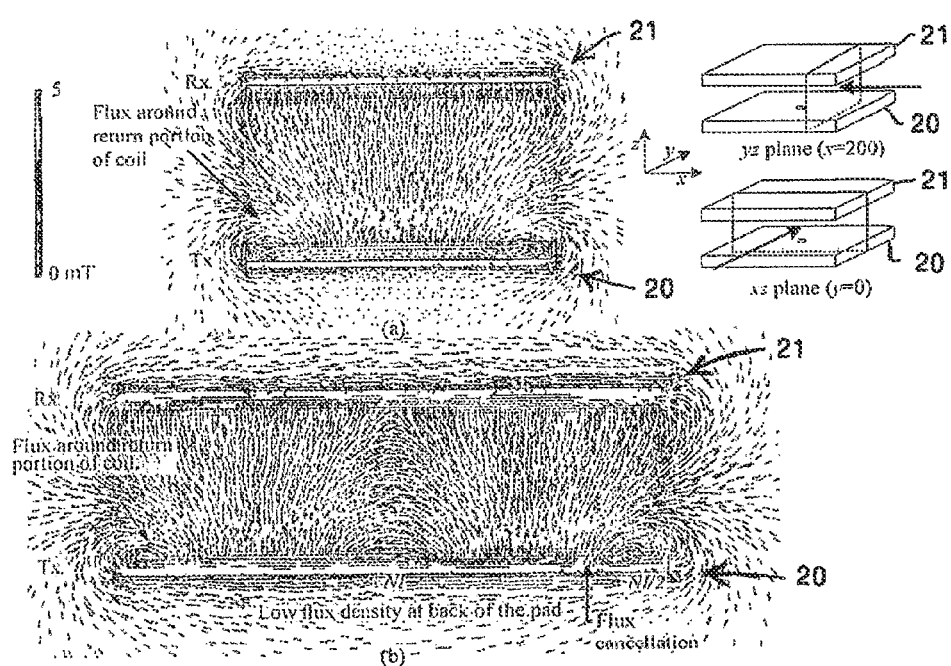
FIG. 3 shows simulated magnetic flux vectors for the arrangement shown in FIG. 2, specifically (a) Magnetic flux density vectors in yz plane (x=200) and (b) flux density vectors in xz plane (y=0)($I_1$=23 A/coil).

Results of the simulation for the FIG. 2 embodiment are shown in FIGS. 3(*a*) and 3(*b*) in which magnetic flux density vectors in the yz and zx planes are used to show the magnetic field shape between pads 20 and 21. In the simulation, pad 20 is energised so as to generate flux and pad 21 intercepts or receives flux generated from pad 20. The origin of the x, z, and z axes is at the centre of the coupling surface of pad 20. The yz plane intersects the x-axis at 200 mm thus it is positioned close to the centre of a pole area. The flux density scale has been adjusted to a maximum of 5 mT to better show the flux in the air gap between the pads. As shown in FIG. 3(*a*) there is a large amount of flux around the return portion 9 of the coil and although some flux does couple to the corresponding section of coil in the receiver (mutual) flux, a large proportion is leakage flux and this contributes to the undesirable pad leakage inductance.

From FIG. 3(*b*) it can be seen that there is some flux cancellation close to the ends of the core i.e. at either end of the x axis; this is because the current direction in the return portion 10 of the coil is opposite to the current direction in the centre portion 8. The position of the cancellation is biased to the end of the pad due to the increased ampere-turns (NI) in the centre i.e. about the x axis. There is no flux directly out of the back of the pads. However there are flux paths that travel behind the pad in order to link the return portion of the coil winding, but these are long and therefore the flux density is low.

The leakage inductance of the coupler structure shown in FIG. 2 can be reduced by removing the ferrite from under the return portions 9 and 10 of all the coils, and this will favourably increase k as the inductance of the coil will reduce but M remains essentially unaffected.

The results for a coupler arrangement according to the FIG. 2 embodiment but with ferrite removed from under the return portions 9 and 10 of the coils are shown in Table 2. The first column of Table 2 contains parameters for inter-pad coupling and the second for intra-pad coupling. There is almost no change in M and there is a reduction in L from 789 µH to 706 µH, which increases k to 0.24.

The new pad topology results in a coupling mechanism between the coupler devices which is dramatically changed. The return winding portions 9 and 10 on the coupled devices do not couple directly but rather increase the magnetic potential around each coupler structure which forces the mutual flux from the structure generating the flux to the structure receiving it in both the xz and yz planes. The topology has the added advantage of only minimal added inductance.

TABLE 2

MODIFIED PAD PARAMETERS AND INTRA-PAD COUPLING FOR PADS WITH FERRITE REMOVED FROM RETURN PORTIONS OF THE COILS

| $V_{oc}$ | 489 V | L (coil) | 240 µH |
|---|---|---|---|
| $I_{sc}$ | 5.52 A | $M_{ip}$ | 114 µH |
| $P_{su}$ | 2703 VA | $k_{ip}$ | 0.471 |
| M | 1.69 µH | | |
| L (pad) | 706 µH | | |
| k | 0.24 | $I_1$ = 23A at 20 kHz | |

As shown in Table 2 the intra-pad coupling coefficient has increased by than three times to 0.47 indicating that the coupling between pads is mainly due to flux on the desired fundamental path $\varphi_{ip}$ illustrated in FIG. 1. The large increase in $k_{ip}$ is due to a more than double increase in the intra-pad mutual inductance ($M_{ip}$). This is far greater than expected given the coils are close together forming the midsection for both types of pad pairs (with a solid ferrite sheet and with ferrite removed from under the return portions). The increase in $M_{ip}$ is due to favourable magnetisation of the ferrite core. This can be seen with reference to FIGS. 4(a) and 4(b).

FIG. 4(a) shows magnetic flux density vectors in the xy plane through the centre of the ferrite sheet core 5 for the coupler pad 20 of FIG. 2. Coupler pad 21 is present with a vertical (i.e. z axis) separation of 200 mm, and is open circuited. The left side coil of pad 20 is energised and the right side coil is left open circuited. The flux density scale has been set to a maximum of 20 mT. The greatest flux density occurs in the midsection of the pad as shown by the red vectors. This is due to the presence of ferrite on both sides of the coil enabling greater flux linkage than on the return portions.

The large volume of ferrite enables flux from the energised coil to spread out across the entire slab causing a significant amount of common mode flux in the adjacent coil. The density of the common mode flux is relatively uniform across the area of the coil on the right as shown by the green to light blue vectors. In consequence, the intra-pad coupling is due to a small change in the flux density hence $k_{ip}$ is only 0.15.

There is a change in the direction of the flux density vectors toward the left of the excited coil as labelled in FIG. 4(a). This is due to opposing flux caused by an effective change in current direction (labelled as due to the coil structure. This creates a flux reversal and it is positioned to the left of the pad because of the increased flux density in the midsection due to the relatively low reluctance paths around the coil (as it is surrounded by ferrite).

Magnetic flux density vectors in a modified equipotential surface pad with ferrite removed from under the return portions 9 and 10 of the coils is shown in FIG. 4(b). Again, the left coil is the excited coil while the right side coil is open circuit. The magnetisation of the ferrite is preferable as it channels a significant amount of flux from the excited coil through the neighbouring coil increasing $k_{ip}$ from 0.15 to 0.47. Also, the flux about the return portions 9 and 10 of the excited coil is reduced thereby reducing the leakage inductance significantly.

Almost all of the magnetic flux shown in the central plane of the ferrite sheet is in the x-axis direction. There is only a slight divergence at the ends of the sheet. This is very different to the modified equipotential surface of FIG. 4(a) where the flux diverges from the coil. Note the flux density vectors are only shown on a plane in the xy axis that passes through the centre of the ferrite sheet; clearly magnetisation is required in the z-axis in order for flux to leave or return to the surface of the ferrite sheet.

Figure 4:
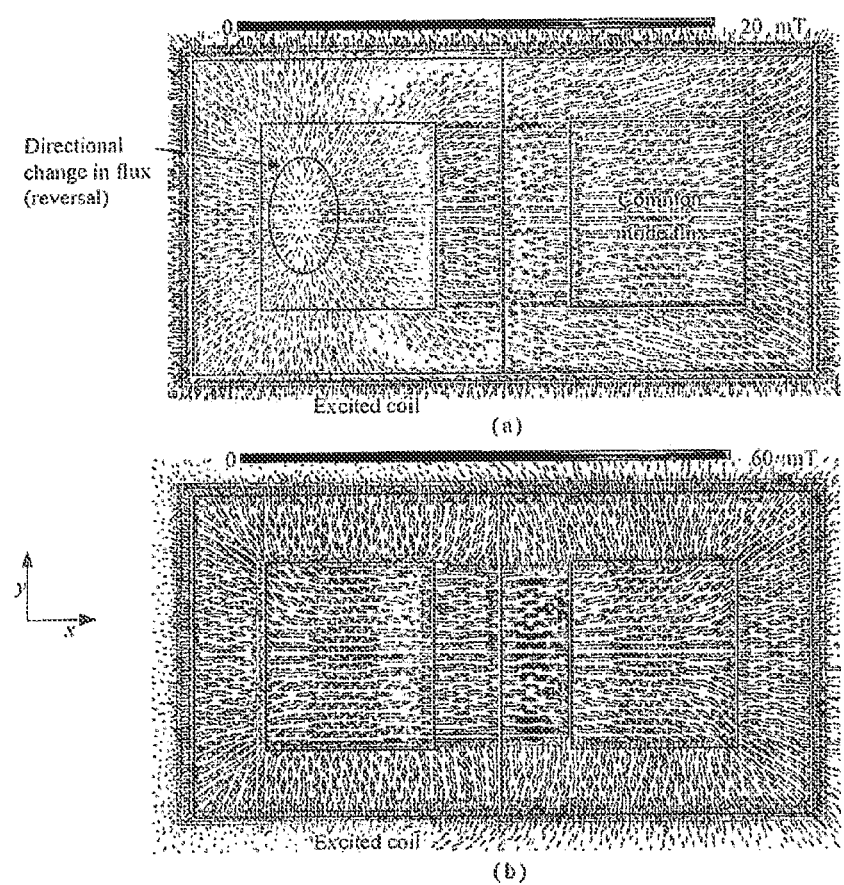
FIG. 4 shows simulated magnetic flux density vectors in xy plane (z=−16) mid way through ferrite sheet with the left coil energised and the right open circuit (a) full sized sheet and (b) ferrite removed from under the coils ($I_1$=23 A/coil).

The pads of FIG. 4 both have ferrite sheets that are 16 mm thick but the modified equipotential surface of FIG. 4(a) has a significantly greater ferrite cross-sectional area than the pad of FIG. 4(b) resulting in a lower maximum flux density of 20 mT.

However, as described above, the additional ferrite area only contributes to leakage inductance and ultimately lowers the coupling factor between two pads (0.24 vs. 0.22). The pad of FIG. 4(b) has less ferrite, resulting in a maximum flux density of 60 mT. Ferrite utilisation is measured in VA coupled per $cm^3$ of ferrite (at an air gap of 200 mm in this case) and for the pad of FIG. 4(b) it is 0.6 $VA/cm^3$. It is 0.24 $VA/cm^3$ for pad of the FIG. 4(a).

Although the ferrite utilisation is higher in a pad with ferrite removed from under the end windings, the actual value is similar to optimised circular designs (where a value of 0.4 $VA/cm^3$ is possible with a 200 mm air gap). That is, even with highly desirable flux paths, the modified equipotential surface uses ferrite only slightly more effectively than previously designed circular pads. The pads can be made much lighter and more cost effective by removing ferrite appropriately as discussed in the next section.

Development of "Double D" (DD) Type Couplers

The maximum flux density of 60 mT, shown in FIG. 4(b), is very low given the ferrite material used is N87 which has a saturation flux density of 490 mT at 25° C. Removing ferrite and operating with higher flux densities will result in a higher ferrite utilisation value. The main magnetisation in the ferrite slab of FIG. 4(b) occurs in the x-axis therefore ferrite strips 30 can be used to provide a core structure on which the coils a and b sit as shown on the schematic of FIG. 5 while still maintaining good coupling.

Figure 5:
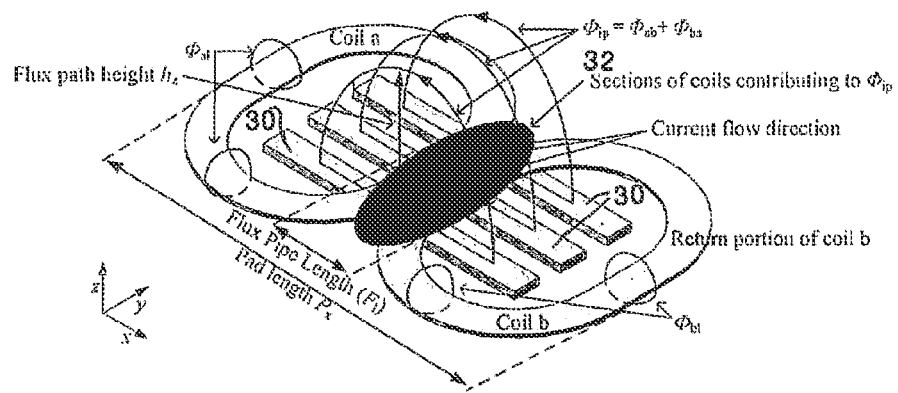
FIG. 5 shows a perspective view of a simplified model of a further coupler construction referred to in this document as a DD pad, with main flux paths $\varphi_{ai}/\varphi_{bi}$ and $\varphi_{ip}$, due to coil a, b and mutual coupling between coils respectively.

The coils in FIG. 5 are labelled 'a' and 'b' and the return portions create leakage flux, which is referred to as $\varphi_{b1}$ and $\varphi_{a1}$, and intra-pad flux ($\varphi_{ip}$), a part of which couples to the receiver. In order to reduce the length of wire to minimise cost, leakage inductance and copper loss, the return portions of the coils should be made roughly semi-circular and since two such coils are placed back to back, this new pad topology is referred to in this document as the "Double D"

or DD. The shaded mid-section 32 of the pad is referred to as a flux pipe (of length $F_1$) where the greatest concentration of flux is located in the central region of the pad due to the geometry and proximity of the coils and the fact that they are connected magnetically in series. The coils are connected electrically in parallel to lower the impedance seen by the power supply. The fundamental flux path height, $h_z$, is proportional to half of the length of the pad ($P_x/2$) but it also depends on the length of the flux pipe ($F_1$).

A 3D FEM model was created to investigate flux paths produced in a DD pad system comprising an identical transmitter and receiver (both having the structure shown in FIG. 5, and being vertically aligned) with an air gap of 200 mm. The pads measure 0.77 m by 0.41 m and are ~35 mm thick and use four ferrite strips 30 spaced 33 mm apart comprising six I93 cores; these are referred to as 4×6 pads. Double D pads of this size achieve a coupling factor 0.23 with a 200 mm air gap. As long as the pads are correctly matched to the operational air gap the flux paths will be similar.

Figure 6:
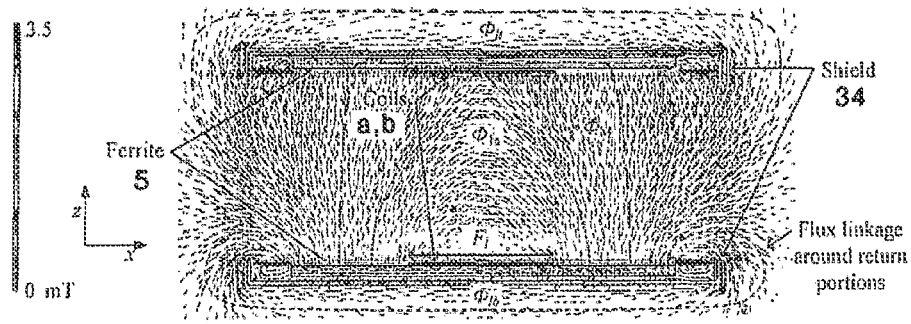
FIG. 6 shows simulated magnetic flux density vectors in the xz plane of a DD pad system of FIG. 5 with superimposed idealised flux paths, these are: top, air gap and back leakages ($\varphi_{lt}$, $\varphi_{la}$, $\varphi_{lb}$) and mutual flux ($\varphi_M$.) $I_1$=23 A, 20 turns/coil and the "receiver" pad is open circuit.

A cross-section of the simulation model of the 4'6 pads is shown in FIG. 6 with idealised flux paths superimposed. Each pad has a backing shield 34 of a material such as aluminium. The 240 mm long flux pipe channels flux to the pole faces where it is launched on one of four general paths on the xz plane shown. The majority of the flux goes to the opposite pole face (shortest path) forming the air gap leakage flux and this is reflected by the highest flux density on the $\varphi_{la}$ contour. This increased magnetic flux density above the flux pipe supports the mutual flux ($\varphi_M$), which is also in part attracted to the ferrite in the receiver pad.

The remaining two flux paths $\varphi_{lt}$ and $\varphi_{lb}$ are leakage fluxes which are largely nuisances and ideally should be reduced to minimise the leakage that may be generated as described later as they do not directly or indirectly contribute to coupling but rather to magnetic field leakage. The flux behind the transmitter pad ($\varphi_{lb}$) is due to linkage of the return portions of the windings, while the flux above the receiver pad ($\varphi_{lt}$) is due to linkage of the flux pipe. The flux paths for leakage fluxes $\varphi_{lb}$ and $\varphi_{lt}$ are relatively long and as such the flux density in these areas is very low as shown in FIG. 6.

Leakage Flux Reduction Approaches

As described above, early closely coupled systems such as that described in U.S. Pat. No. 4,873,677 (to Seiko) are often designed in a similar manner to transformers and wind coils about large cores. As shown earlier, this significantly increases the inductance of the coils and reduces the inter-coupling of the two coils creating the poles. This has minimal effect in transformer type applications where the primary and secondary systems are in close proximity and exhibit reluctance paths which are low (and therefore preferable), but for loosely coupled systems where the air-gaps are large and there is likely to be significant misalignment between the primary and secondary, there will be a dramatic reduction in system coupling factor and capability of the system to transfer power if large ferrite slabs are used. This is because the extended ferrite provides an alternative and desirable reluctance path which acts against the desired flux paths which create the mutual coupling between the primary and secondary magnetics. The DD pad structures proposed in our international patent publication WO2010/090539 (the disclosure of which is incorporated herein by reference) use strips of ferrite which end on the primary typically end before the return portion of the coil, while on the secondary these can extend to under the return portion of the coil (to improve performance of a third "quadrature" coil). There is no exposed ferrite (except at the poles) in order to maximise the inter-coil coupling in each pad.

A limitation of this later construction is that the nuisance fluxes which contribute to leakage (as described above) are not contained, and in most constructions are forced further away and behind the pad due to the presence of a suitable metallic (e.g. an aluminium) shield. In almost all designs the pads have been constructed to purpose to ensure power coupling is achieved, but as shown here, this results in a sub-optimal design with leakage fluxes which may be unacceptable for present leakage limits.

Therefore, in at least one new embodiment, leakage flux is reduced by adding a limited amount of a magnetically permeable material, such as ferrite, to the end sections of one or both the primary and secondary pads and selectively exposing the ferrite in specific regions to provide auxiliary pole areas or pole faces as will be described further below. Surprisingly two quite distinctive but useful effects result based on the topology of the activated coil. In a polarised structure such as the DD, leakage flux is significantly reduced, while in a circular structure such as the quadrature coil, main flux coupling is improved.

Figure 7:
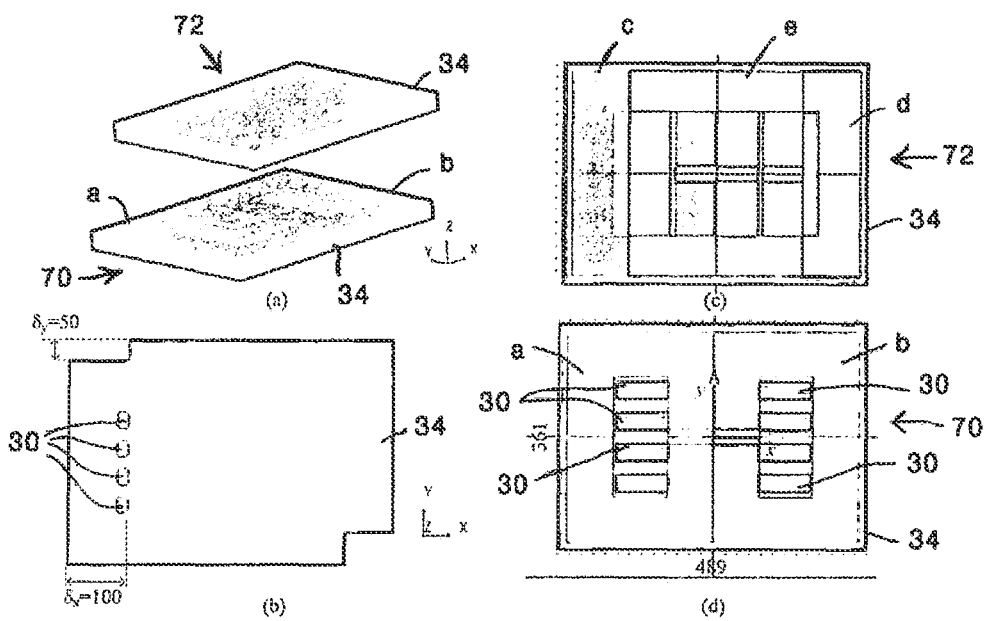
FIG. 7 shows a primary (transmitter or Tx) pad having a DD structure and a secondary (receiver or Rx) pad having a DD plus quadrature coil arrangement.

As an example of the inherent problem to be solved, FIG. 7 shows a typical arrangement of polarised couplers as described in WO2010/090539, where the primary 70 has two coils a and b wound in series but energised out of phase to produce a north and south pole, while the secondary structure 72 has three coils c, d and e. Coils c and d of the secondary are constructed identical to coils a and b the primary, and the third coil e is placed in the centre as a quadrature winding as described in WO2010/090539. Both the primary and secondary are placed above strips of ferrite 30 which sit above an Aluminium back-plane 34. In this application the primary and secondary structures have dimensions slightly less than 500×400 mm (this design is referred to hereafter as D9) and would be expected to couple full power in a zone with displacements of at least 150 mm in either the x or y direction with typical variations in gap between the pads of between 75-150 mm. The power profile for this design is shown in FIG. 24 and again labelled as D9 for a vertical displacement of 140 mm.

Figure 8:
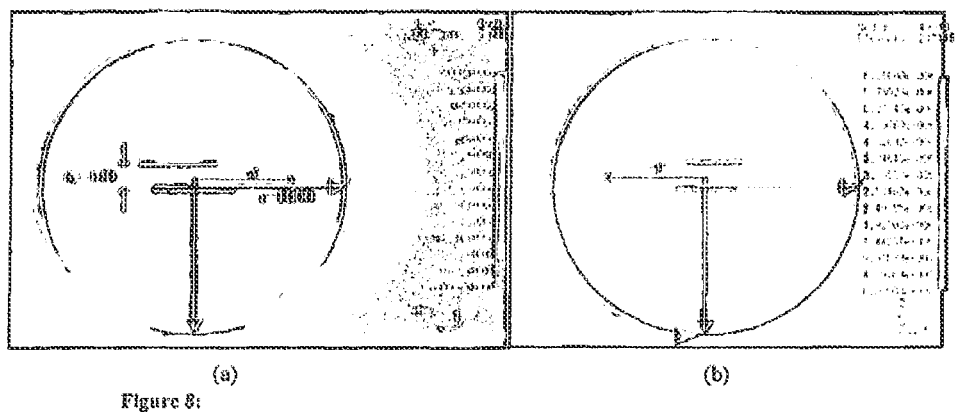
FIG. 8 shows flux density for the FIG. 7 arrangement in (a) xz and (b) yz planes.
Figure 22:
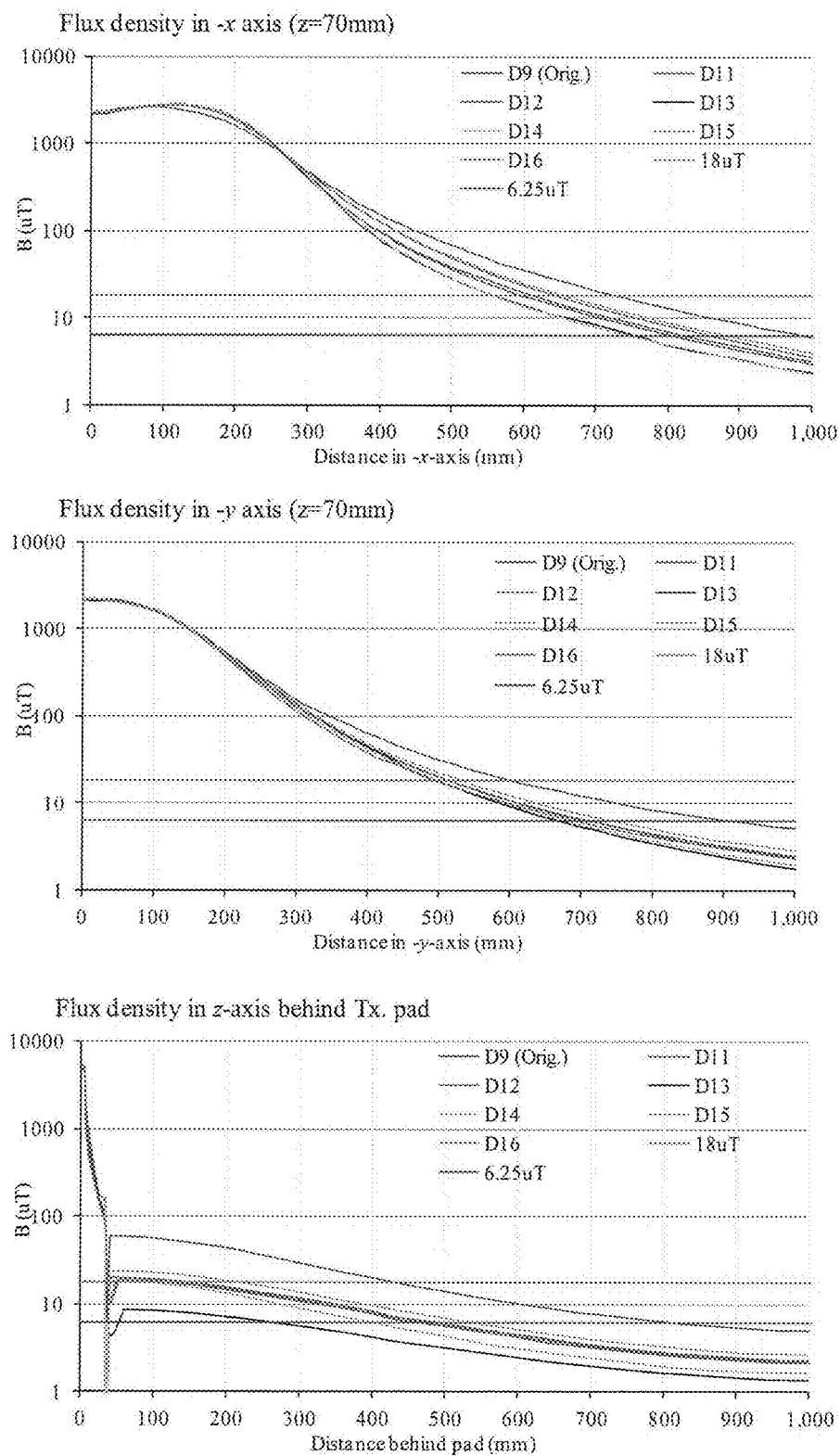
FIG. 22 shows plots of simulated field strength against distance.

When the primary winding is energised, there is a field which is generated in all directions and which also radiates around both the primary and secondary pad driven by the leakage fluxes given in FIG. 5 and labelled as $\varphi_{al}$ and $\varphi_{bl}$. An example of the expected leakage as generated from the DD structure is shown in FIG. 8. Here the secondary is displaced within the expected power transfer zone having a z displacement of 140 mm and lateral displacements of +100 mm in the x and +50 mm in the y direction. The leakage which is generated when only the primary is energised (here currents are inserted into the coil at 10 kHz) is determined by taking vertical planes through the pads in the xz and yz directions and drawing a circle at 1 metre radius from the midpoint of the primary pad at the surface (here (x,y,z)=(0,0,0)). All field levels larger than 6.25 uT (the ICNIRP limits imposed in 1998) are shown in red. Actual values of the flux density when the secondary is also positioned relative to the primary at (x,y,z)=(100,50,140) can be explicitly calculated along a line in the −x and −y directions midway between the pads (at 70 mm height from the centre point of the primary as depicted in FIG. 8). In this direction the field containment is lowest due to the relative displacement of the primary and secondary pads, as shown in FIG. 22. Also shown in FIG. 22 is the flux in the z direction from the surface of the primary pad (starting at (x,y,z)=(0,0,0)) extending in the −z direction through the primary pads and outside the back (the Pad is approximately 30 mm thick) and therefore the discontinuity at this point indicates the point where the actual back of the primary pad exists behind the aluminium shield where ideally the leakage flux should be zero. This leakage flux exists because of the nuisance fluxes described earlier and has a larger than desirable value, well above expected levels.

Figure 9:
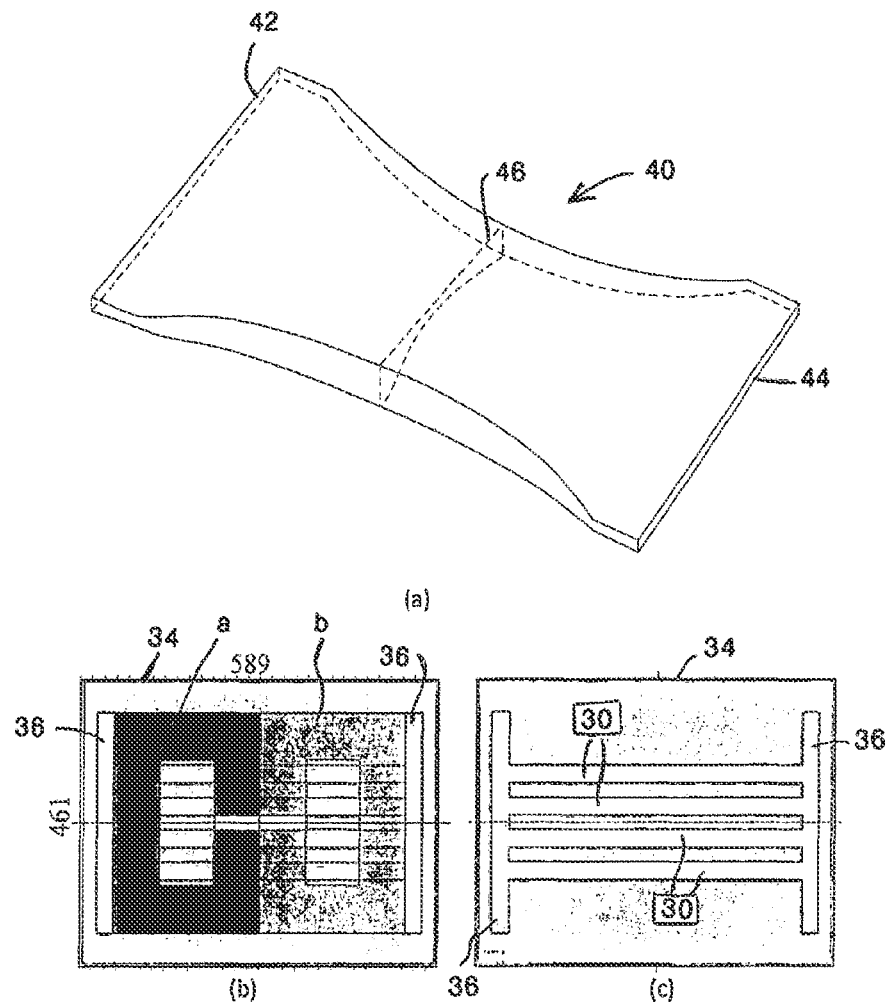
FIG. 9 (a) shows an ideal ferrite core structure, (b) a D11 pad structure having ferrite extending beyond the end periphery of the coils, and (b) the ferrite structure for the pad shown in (b)

An ideal preferred ferrite structure 40 is shown in FIG. 9(a) in concept. Here the ferrite is shaped to capture the nuisance leakage at the ends 42 and 44 which are exposed to provide auxiliary pole areas, and to enhance the main fields between the poles without encouraging additional nuisance fluxes outside the coils (as shown in FIG. 4). The ferrite is flat on the top surface on which the coils are positioned (although not shown), but underneath it is shaped and naturally thicker in areas where the main flux is higher to avoid saturation. As such the ferrite in the centre between the coils carries main (i.e. coupling) flux, and needs have more area, while the ends of the transmitter carry only leakage flux and can be very thin. Across the centre line 46 (indicating the cross section transverse to the main axis) the thickness also varies, since at the edges the coils produce more field than in the centre and therefore this region requires more ferrite. In practice, often this ideal structure is built using readily available ferrite material (such as blocks of ferrite) and there is an advantage to reduce the ferrite material to reduce the inductance (provided saturation does not arise). This conceptual structure is therefore built in practical form as shown in FIGS. 9(b) and 9(c) using ferrite blocks pressed together.

Figure 10:
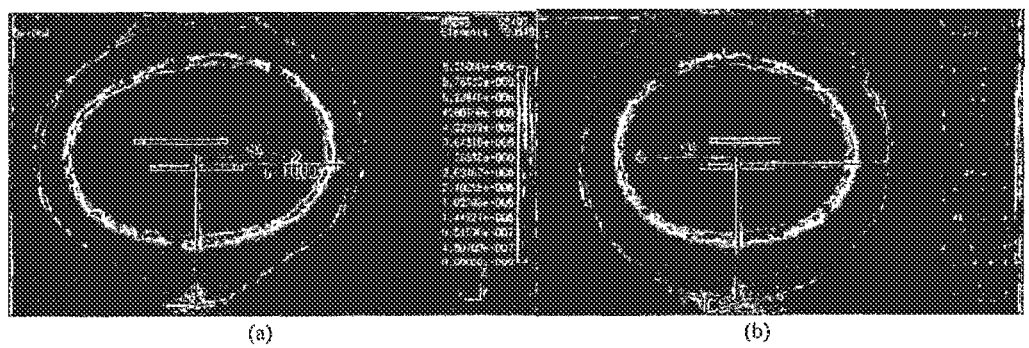
FIG. 10 shows flux density for the FIG. 9 (D11) arrangement in (a) xz and (b) yz planes.

This magnetic structure for the coils which create the poles of the primary using blocks of ferrite as strips 30 and a single strip of ferrite 36 at the end is shown in FIGS. 9(b) and (c) and referred to herein as D11. Here the coils a and b remain identical in size to that of the earlier design D9, but the aluminium back plate 34 is extended to accommodate the ferrite extension 36 which is present at the ends of ferrite strips 30 in both the primary and secondary. The impact on the field leakage is immediately apparent in FIG. 10 and in FIG. 22. The reason for this is that the nuisance fluxes at the ends of the pads (in the x direction) are captured by the ferrite at the auxiliary pole areas and guided through the back of the pad. Consequently the flux leakage in the back of the pad is significantly reduced, and less leakage radiates out. In consequence the field at the back of the pad drops from 80 uT to below 20 uT and rapidly falls below 6 uT after 400 mm whereas previously it fell to this level after around 770mm. In the x and y directions the fields drop to below 6.25 uT after 800 mm and 700 mm respectively for D11 instead of 980 mm and 900 mm in D9 respectively. As the end of the pad is around 245 mm in the x direction and 180 mm in the y direction then leakage fluxes will not begin to fall until after this point. In the x direction D11 takes 555 mm to drop to the 6.25 uT level while D9 takes 735 mm (a 25% reduction for D11). In the y direction, the field for the D11 structure drops within 520 mm rather than 720 mm (a 28% reduction).

Figure 23:
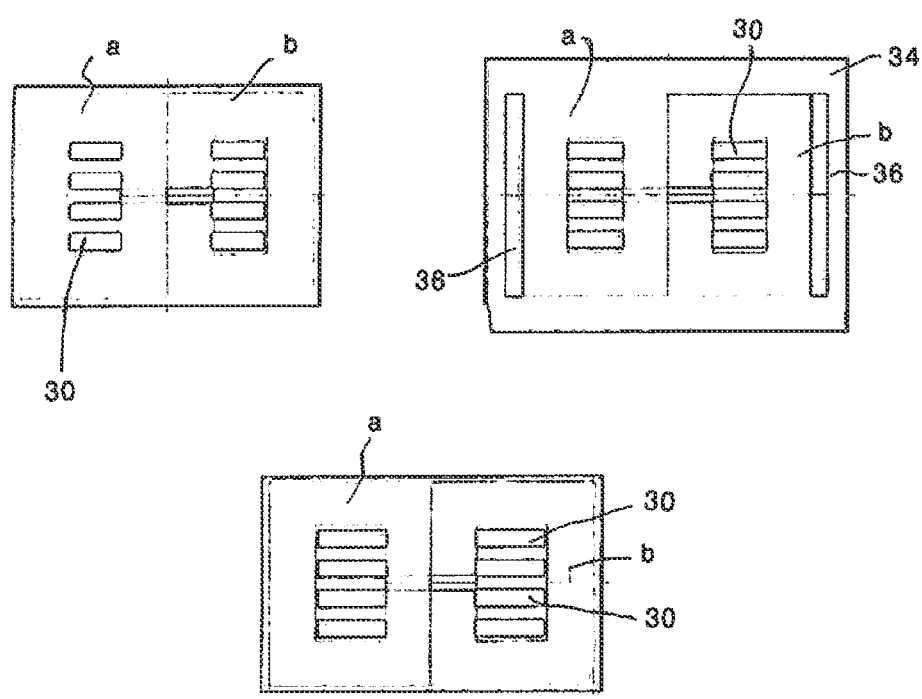
FIG. 23 shows plan views of (a) a d9 structure, (b) a D11 structure, and (c) a D17 structure.
Figure 24:
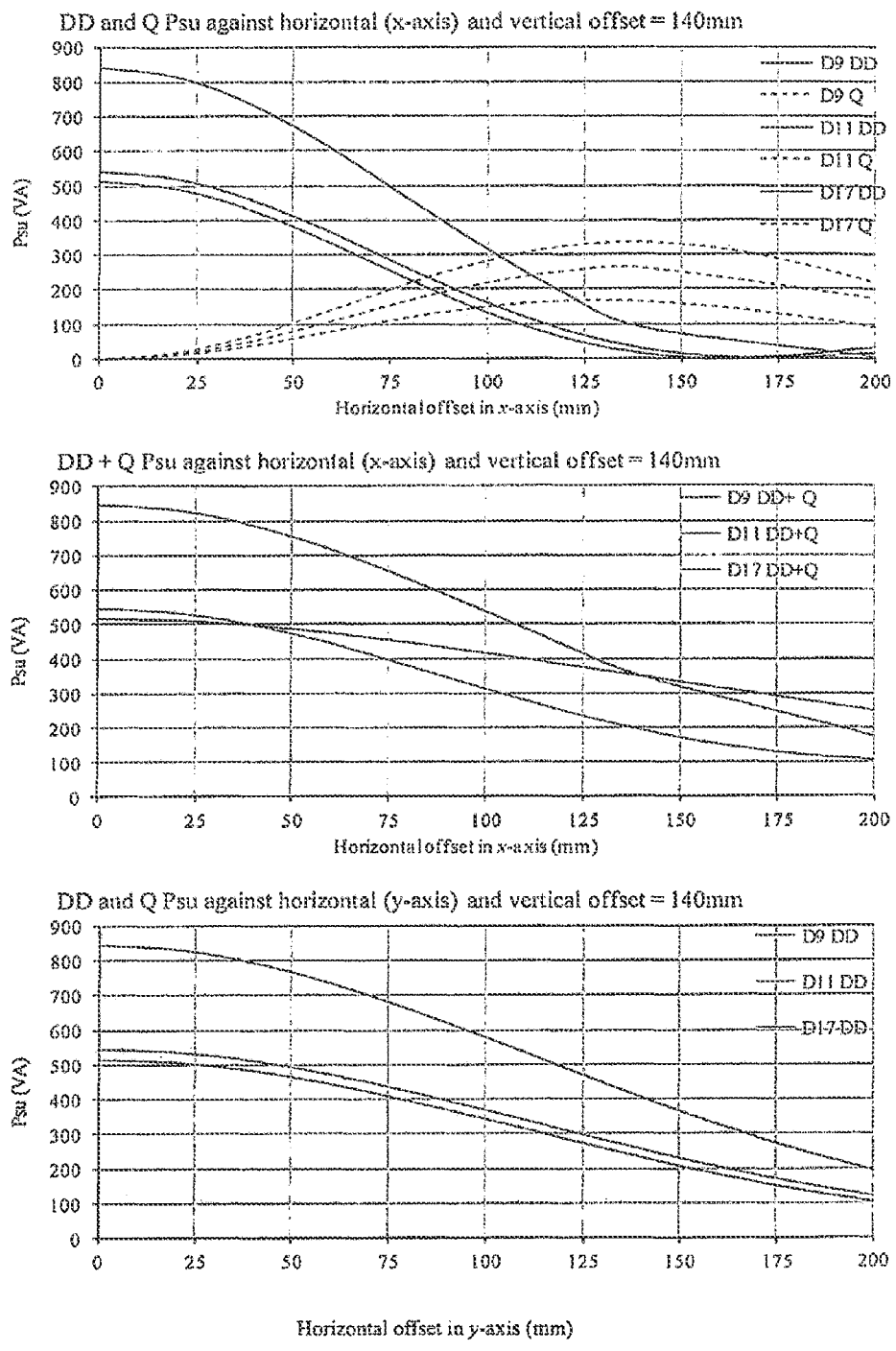
FIG. 24 shows plots of simulated power against horizontal offset for various pad structures.

The power profile associated with the D11 structure is shown in FIG. 24 (in comparison with D9 and another structure described further below). In this case the aluminium shield 34 is slightly larger (the dimensions are depicted in FIG. 23) but this does not significantly alter the power profile. As shown, the impact of adding the ferrite slightly reduces the DD (D9) power profile, (by less than 10%) but the existence of the ferrite strip 36 in the secondary significantly increases the capability of the quadrature coil e (which is referred to as Q in FIG. 24) to capture flux (almost doubling its capability) as shown. Consequently the power capability in the x direction significantly improves, and has only a small impact in the y direction.

Against this, if the coils themselves were lengthened (allowing the poles to be shifted slightly further apart) to fit the extended volume that the ferrite in D11 allows, then there will also be an improvement in power coupled. This structure is shown in FIG. 23 as D17 in which the lengthened coils cover ferrite end strips 36. The improvement in coupled power (as shown in FIG. 24), appears significant, but alongside this there is also a corresponding increase in leakage flux as the coils are pushed out further. As shown, when the secondary is displaced laterally by 125 mm, the power delivered is identical between D17 and D11. As this is within the power zone expected for coupling power, consequently there is no advantage given D11 will significantly reduce field leakage while D17 will have leakages above that of D9 because the pole ends are larger.

Figure 25:
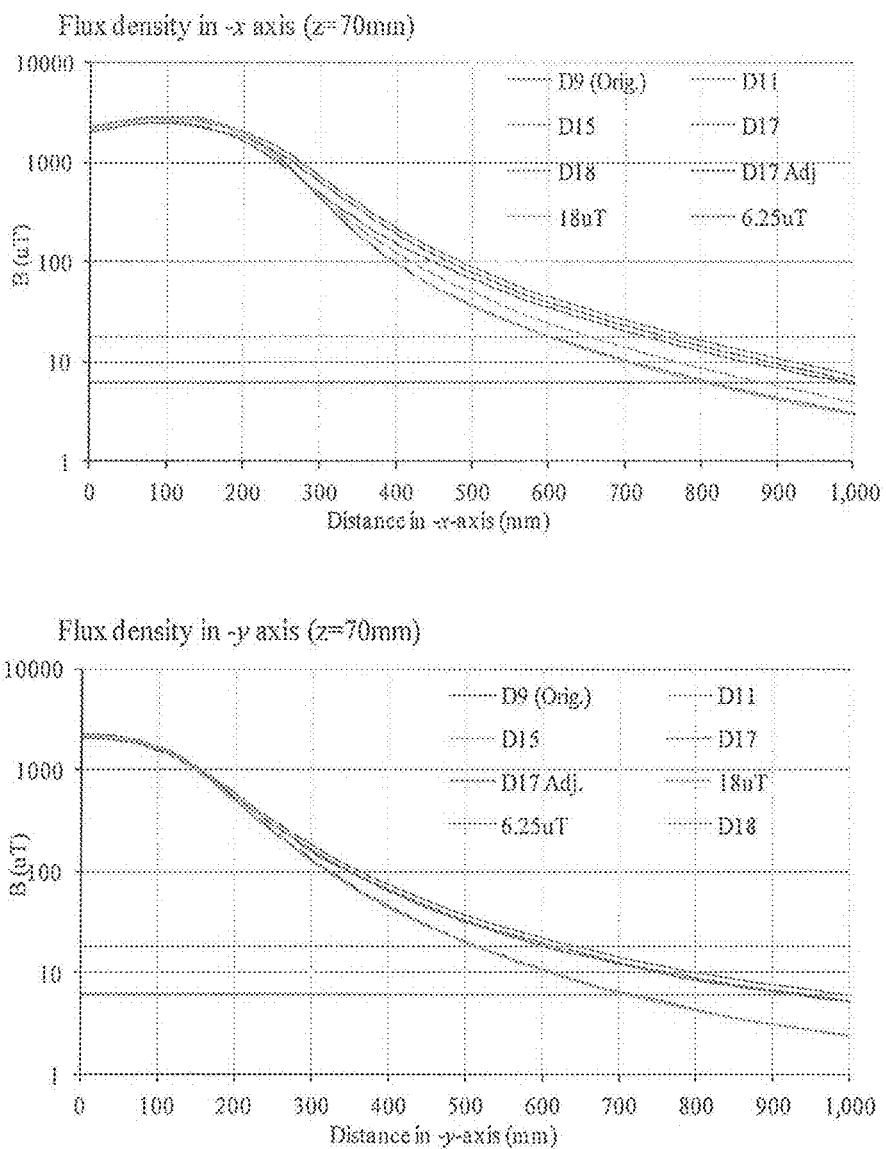
FIG. 25 shows plots of simulated field density against distance for various pad structures.

This is validated in FIG. 25 where the output leakage of D17 is compared against that of D11 with each system's secondary pad displaced (in mm) to position (x,y,z)=(100, 50,140). Here the VA driving D9 and D17 is identical, and the leakage produced by D17 is significantly greater in both the x and y directions. The leakage generated by D17 when it is operated with a reduced VA, (here labelled "D17 Adj") such that the VA coupled into its secondary is identical to that which D11 couples into its secondary, is also shown. Under this condition the leakages of "D17 Adj" are still significantly higher than that of D11 outside the pad dimensions. As such, the impact of the ferrite design is a significant improvement, and surprisingly much better even under these reduced operating circumstances.

Figure 11:
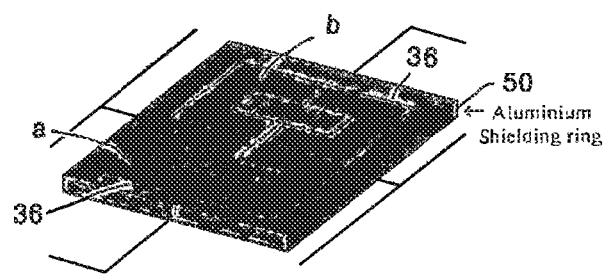
FIG. 11 shows perspective view of a further structure, referred to as a D12 structure, having an aluminium shielding ring
Figure 12:
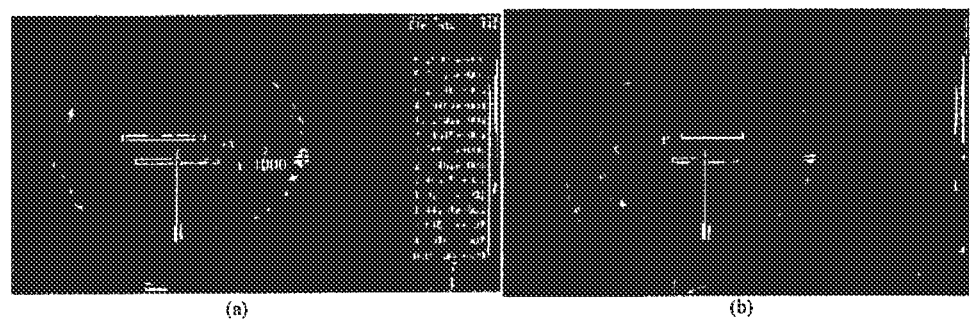
FIG. 12 shows flux density for the FIG. 11 arrangement in (a) xz and (b) yz planes.

In order to evaluate other preferred magnetic structures, and to evaluate the impact of the Aluminium shield 34, various other designs were considered to reduce the leakage flux. D12 of FIG. 11 investigates adding an Aluminium shield ring 50 to the primary. The results are shown in FIG. 12 and FIG. 22. In this case the close proximity of the ring to the ferrite end piece 36 has a slightly negative effect on leakage since it blocks the ferrite sides from attracting leakage flux. Adding a ring to the secondary also impacts the power capture of the quadrature coil e if it is in close proximity.

Figure 13:
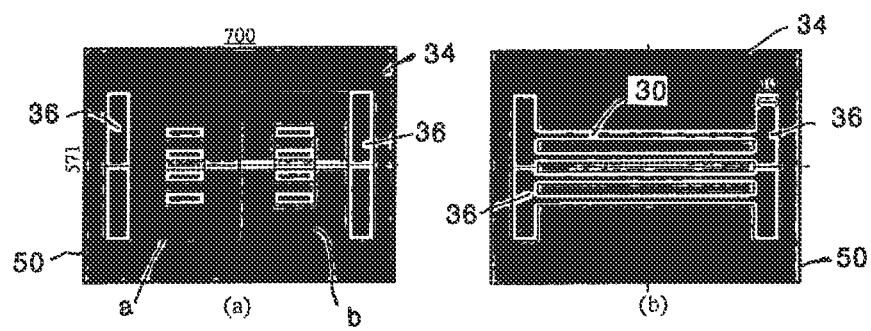
FIG. 13 shows (a) a plan view of a further DD pad structure with enlarged ferrite extensions, and (b) a plan view of the ferrite arrangement.
Figure 14:
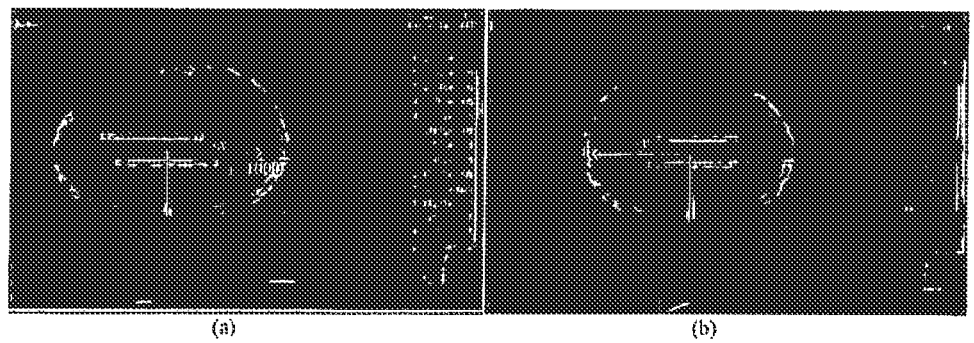
FIG. 14 shows flux density for the FIG. 13 arrangement in (a) xz and (b) yz planes.
Figure 15:
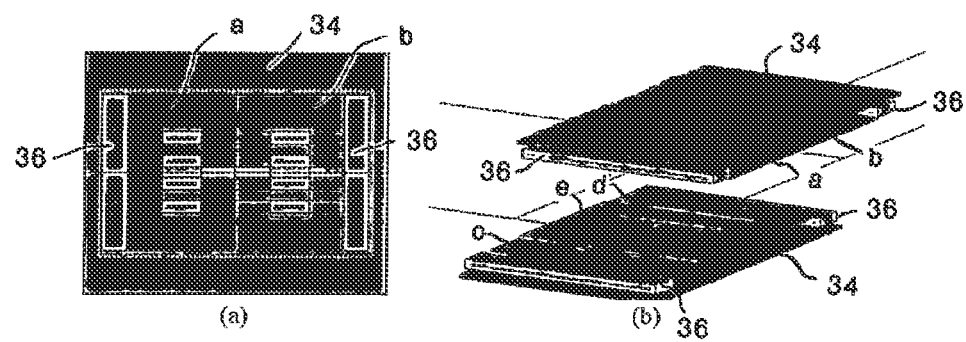
FIG. 15 shows (a) a plan view of another coupler structure, and (b) a perspective view showing an example of a primary and secondary arrangement.
Figure 16:
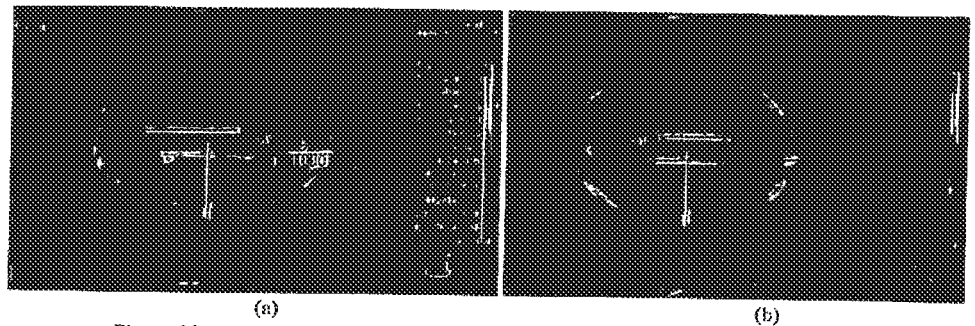
FIG. 16 shows flux density for the FIG. 15 arrangement in (a) xz and (b) yz planes.

In D13 (shown in FIG. 13) and D14 (shown in FIG. 15) the ferrite end piece 36 is widened (in this example it is doubled) to provide a larger auxiliary pole area and the size of the aluminium structure is varied—in D13 a larger back plate 34 is used and the primary shield ring 50 is present while in D14 a smaller back plate is used without the shield ring. As can be seen from FIG. 22, D13 clearly has the largest impact on leakage, and comparison against D14 shows that the ferrite extension 36 has the biggest impact in capturing the leakage in the x and y directions (here it is difficult to see the difference between D13 and D14), while the Aluminium 34 helps shield leakage in the −z direction. Consequently the ferrite addition at the end pieces to provide the auxiliary poles has the most significant impact. It will be appreciated by those skilled in the art that the magnetically permeable members that provide the auxiliary pole areas do not have to be physically connected to, or part of, the core.

Comparing D11 and D13 (or D14), it is notable that the improvements in leakage are small considering the extension in pad size. In FIG. 22, the leakage drops to the 6.26 uT in the x direction at 760 mm (D13, D14) whereas it was 800 mm for D11 and 980 mm in D9. In the y direction the improvements are even smaller. As such the addition of the ferrite 36 at the ends can be adjusted to improve leakage, but widening these ferrite extensions is not normally required.

Figure 17:
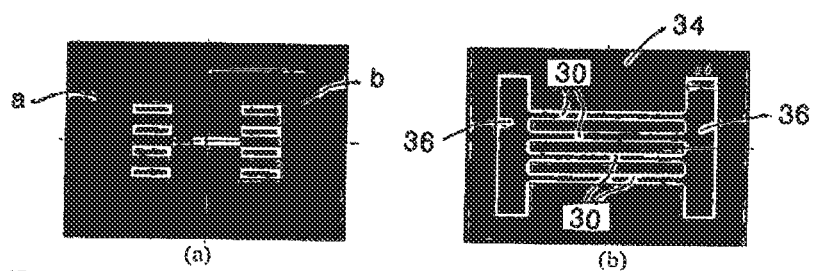
FIG. 17 shows (a) a plan view of a further DD pad structure with enlarged ferrite extensions, and (b) a plan view of the ferrite arrangement.
Figure 18:
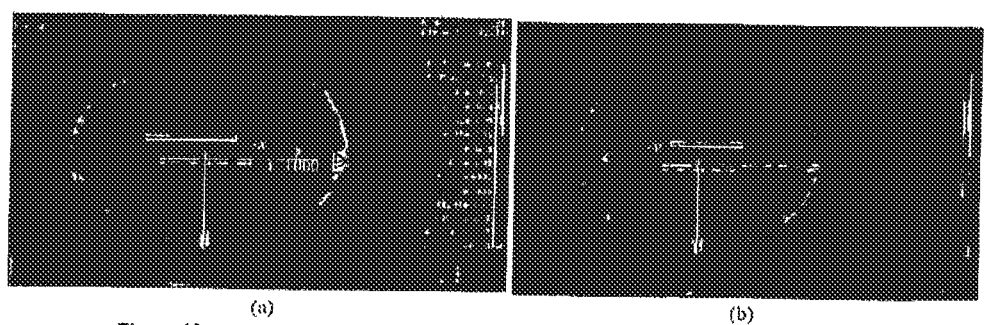
FIG. 18 shows flux density for the FIG. 17 arrangement in (a) xz and (b) yz planes.
Figure 19:
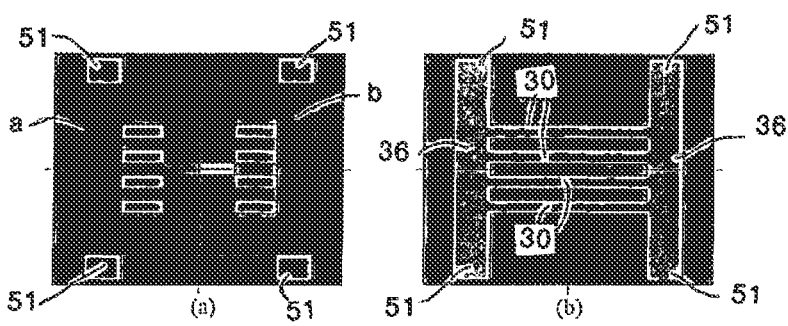
FIG. 19 shows (a) a plan view of a further DD pad structure with enlarged ferrite extensions that also extend beyond the side periphery of the coils, and (b) a plan view of the ferrite arrangement.
Figure 20:
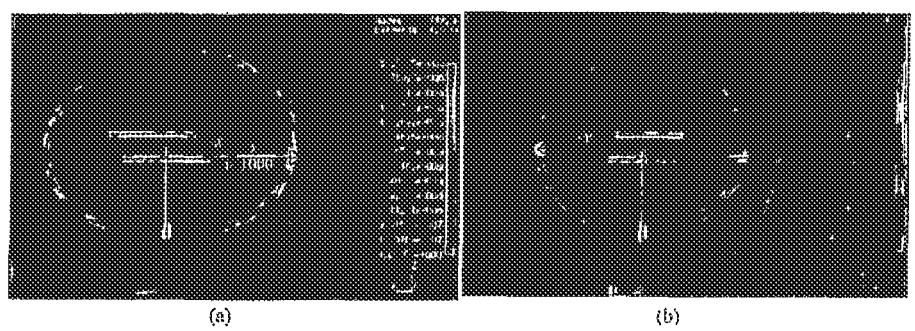
FIG. 20 shows flux density for the FIG. 19 arrangement in (a) xz and (b) yz planes.

For additional comparison—and to further validate that the ferrite should extend beyond the coil ends, large blocks of ferrite were placed at the ends (but underneath the coils) as shown in D15 of FIG. 17. The results presented in FIGS. 18 and 22 show that this improves the leakage compared with D9 but the improvements are not as significant as that seen from D11. Adding additional extensions 51 to the ends 36 beyond the coil sides in the lateral or y directions as shown by structure D16 in FIG. 19 has further improvements to leakage as indicated in the results of FIGS. 20 and 22, but again D9 has slightly better performance. The additional ferrite material in D15 and D16 adds substantially to the inductance of the pad, while the remaining added ferrite 36, as in the D11 structure, remains as strips under the coils and therefore does not increase the inductance as severely. As such D11 has superior performance with less ferrite addition.

Figure 26:
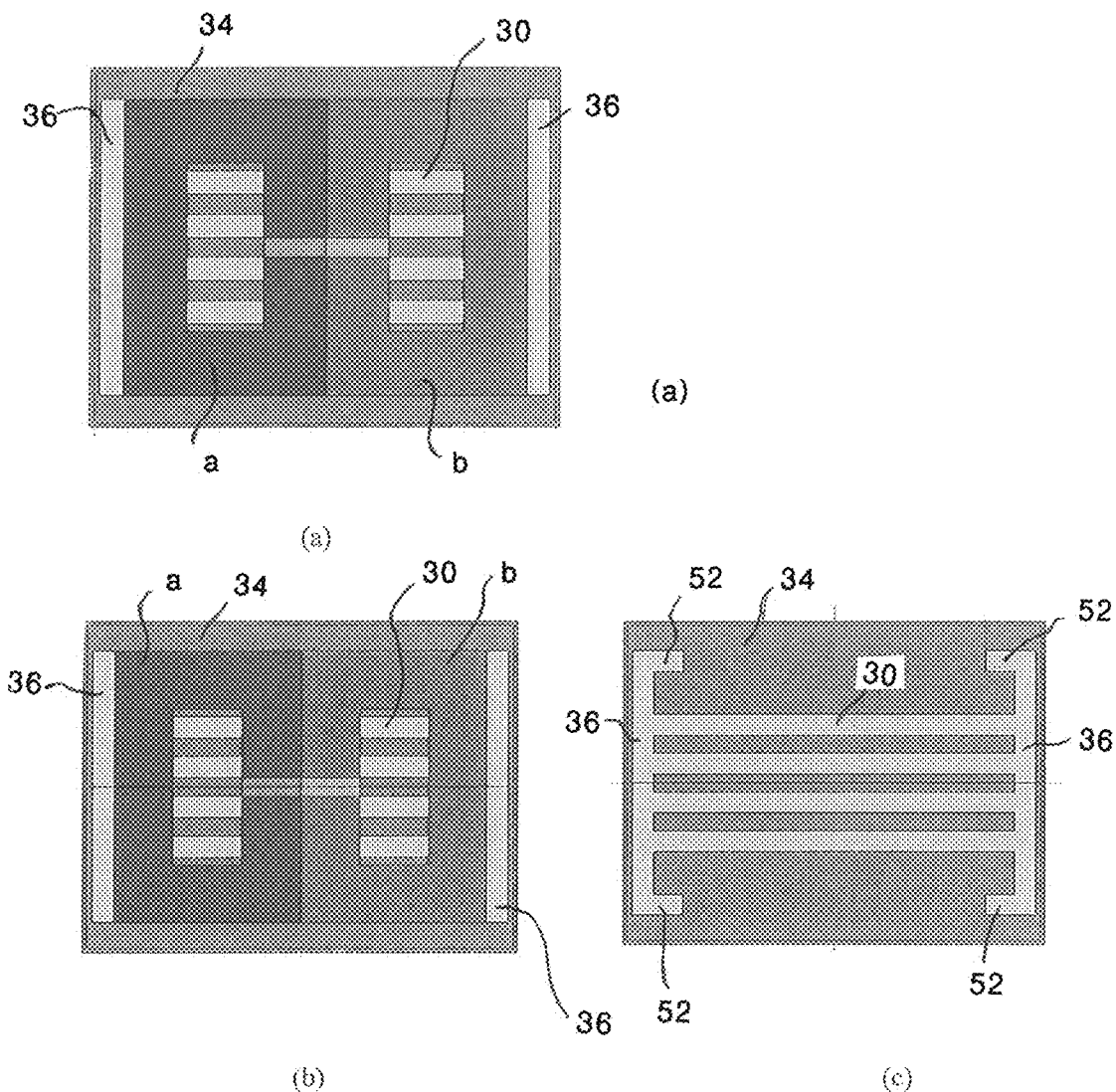
FIG. 26 shows plan views of (a) a D11-2 structure, (b) a D18 structure, (c) the ferrite arrangement for the D18 structure, (d) a D19 structure, and (e) the ferrite arrangement for the D19 structure.
Figure 26:
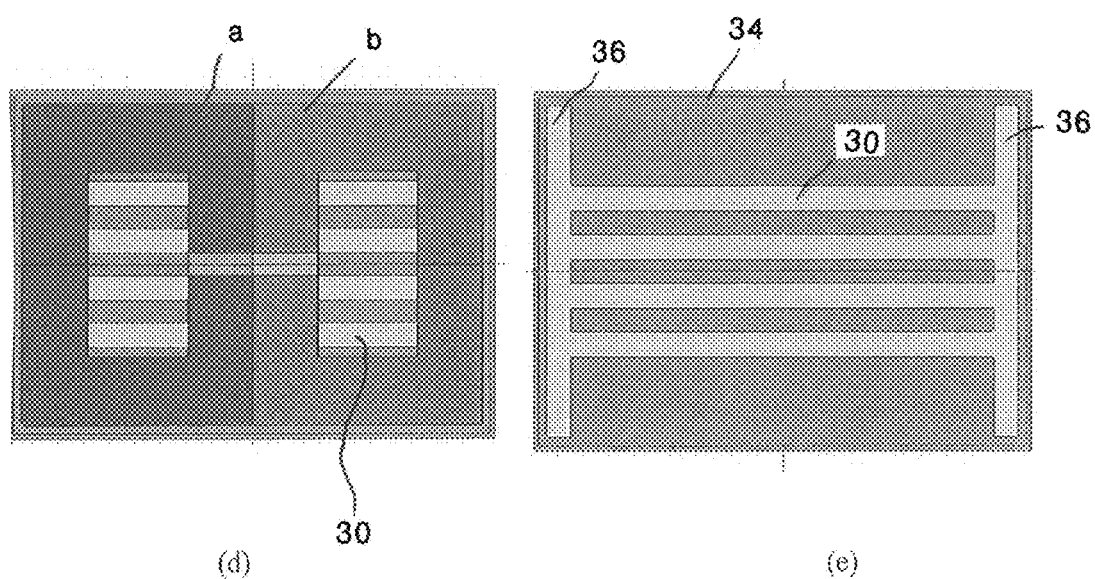

A structure which combines the best improvements of D11 and D16 is shown as D18 in FIGS. 26(*b*) and (*c*). This uses the ferrite structure of D11 with small pieces of added ferrite 52 extending back in the x direction at the side edges (similar to the shape of a car bumper) about half the width of the coil (40 mm as shown). The extent of this ferrite addition needs to be restricted to avoid negatively impacting the power coupling and adding to the pad inductance, and restricting it to no more than half the return coil width is best. The reason such care must be taken was shown earlier in FIG. 4 when extending ferrite in the y direction along the ends of the DD coil has a clear negative impact on power coupling, as the inter-coil coupling drops significantly making it less able to couple power to the secondary structure. When the leakage generated from D18 is compared against D11, D15 and D17 as shown in FIG. 25, it is clear, that no measureable improvement is obtained over that of D11 in either the x or y directions. Thus the simple structure of D11 is clearly preferred.

FIG. 26(*d*) and (*e*) shows the impact of using the enlarged coils of D17 over the back plate of D11. This modified design is here called D19. The leakage produced from D19 is compared with that of D11 with a slightly modified Aluminium backplane in FIG. 27 (this modified D11 is relabelled D11-2 in FIG. 26 but simply labelled as D11 in FIG. 27 as there is practically little difference between these structures). As such the aluminium back plate and ferrite structure on which their respective coils sit of both D11-2 and D19 are now identical. The coil sizes are however the only difference. The power profiles of D11-2 and D19 are identical to that of D11 and D17 (as shown in FIG. 24), and therefore the output of D19 is adjusted so that it couples exactly the same power into its secondary as the D11 system at each position of interest. The leakage produced from D19 when it is adjusted in this way is labelled as "D19 Adj" in FIG. 27 and compared against that of D11-2 (labelled as D11) when both systems have their primary and secondary structures perfectly aligned. As expected, when these systems are under such perfect alignment conditions, there is the greatest difference in power coupling between them.

Figure 27:
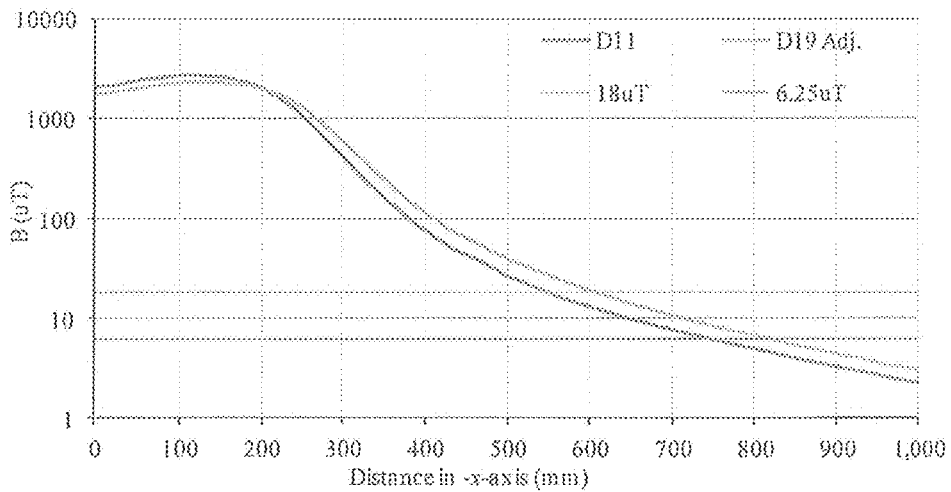
FIG. 27 shows plots of simulated field strength against distance.
Figure 27:
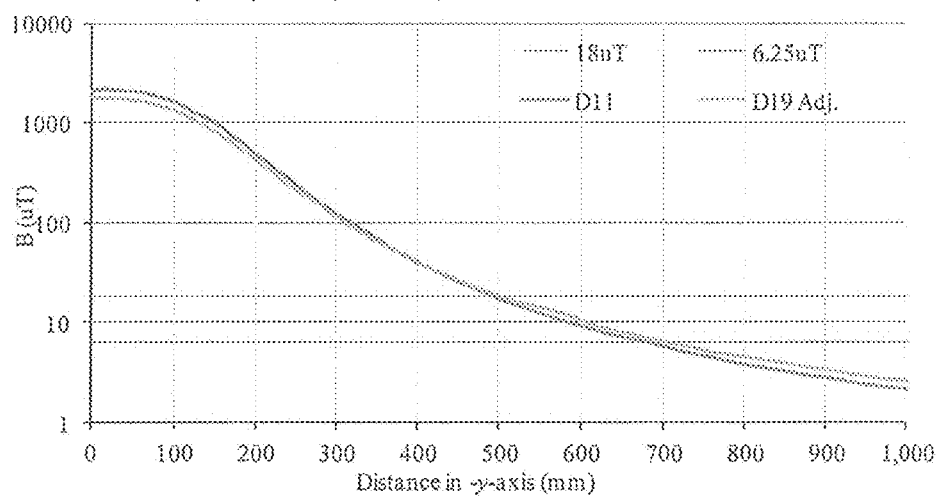

In fact, here D19 couples significantly more power to its secondary because of its larger coils (approximately 60% more) and therefore its driving VA can be reduced to around 66% to match the power transfer of D11 and this in turn reduces the leakage generated. It would therefore be expected that its leakage would be lower with the improved ferrite structure under its coils, however as shown, in the x direction (which is of most concern for leakage flux given this is the longest length of the pad and therefore produces the highest fields nearer the sides of a vehicle, AGV or robot—depending on the charging platform) D11 still outperforms D19. As shown in FIG. 27, the leakage in D19 the worst by almost 10% outside the pad dimensions. In the y direction, the leakages are similar, and this is due to the identical ferrite structures. As shown, the y-axis leakage is slightly lower given this part of the pad is generally narrower, and therefore of less concern.

In summary, the ferrite structure with auxiliary poles provided by exposed end pieces 36 beyond the coils is an important design for meeting leakage reductions. Enlarging the coils to cover this improved structure, while increasing the coupling, does not offer any useful advantage even when these coils are driven with a lower VA, since the leakage produced remains a problem even under ideal conditions, and will only get worse with misalignment in either the x and y direction. This arises because the coupling (as shown by the power coupled to the secondary) of D19 (D17) and D11 converge with misalignment as shown in FIG. 24. Under these conditions D11 significantly outperforms D19 and D17 in terms of leakage as shown in the example of FIG. 25.

Figure 21:
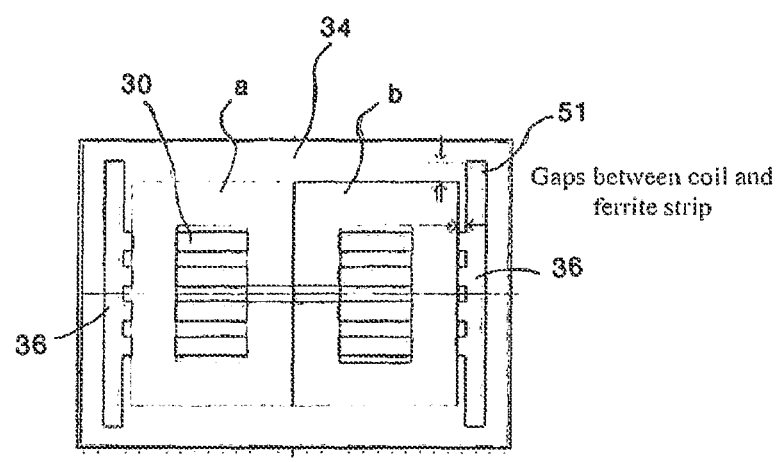
FIG. 21 shows a plan view of a further DD pad, structure with ferrite extensions that extend in a manner whereby they are spaced from the end and side peripheral edges of the coils.

Other improvements to performance of D11 can be suggested as shown in FIG. 21. Here the inductance of the pad is further reduced by placing a small gap between the end ferrite pieces 36 and the respective coils a, b. This extension has to be balanced against increasing the size of the pad—however the size of the primary pads which are placed in a roadway or parking lot can be much larger providing the material requirements are not excessive, the inductances are contained (such that the pad is able to be driven by the supply) and the power delivered is not compromised while leakages are minimised. Additionally, the end pieces 36 can include extensions 51 so that the ferrite extends beyond the side perimeters of the coils.

Figure 28:
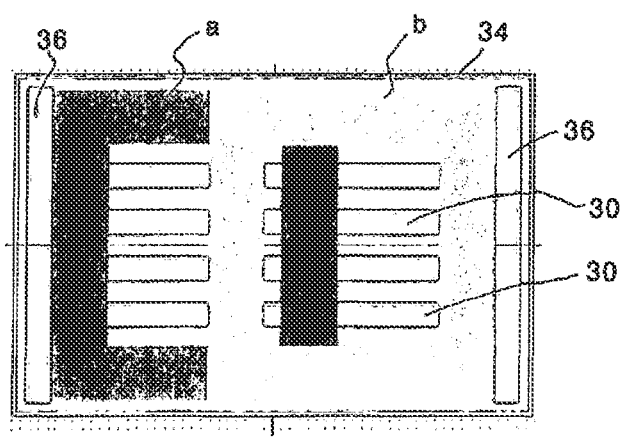
FIG. 28 is a plan view of a bipolar pad structure including ferrite which extends beyond the end periphery of the coils.

The ferrite core structure including extensions 36 can also be used with other pad structures such as those disclosed in our international patent publication WO2011/016737. An example is shown in FIG. 28 in which a bipolar pad as described in WO2011/016737 includes two overlapping mutually decoupled coils a, b on a core constructed from ferrite strips 30 and end pieces 36. The core is provided on an aluminium backing plate 34.

In the primary the ferrite extensions proposed in D11 do not carry significant flux as their main purpose is to capture leakage fluxes. As such the ferrite material can be very thin. In the secondary, the auxiliary pole areas provided by the ferrite end pieces have a dual role. As in the primary, they soak up the leakage fluxes of the DD secondary; however in the quadrature winding they carry main flux when the secondary is displaced, and therefore should be a similar thickness to the strips of ferrite used in pad which are built to ensure little or no saturation during operation.

Further embodiments are now described with reference to FIGS. 29-45.

Figure 29:
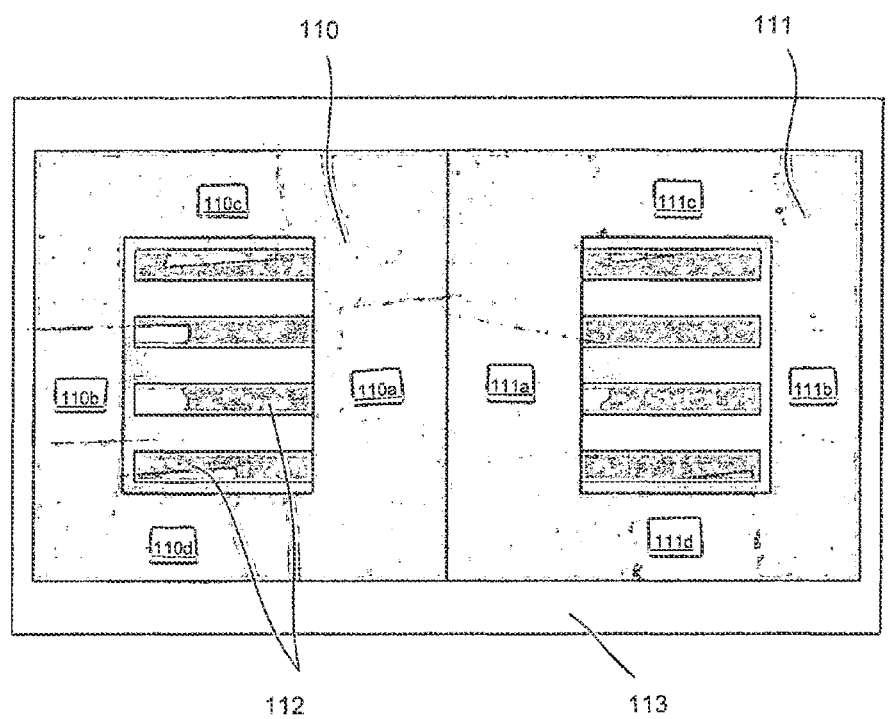
FIG. 29 provides (a) top; and (b) side views of an IPT flux-coupling apparatus according to the prior art, comprising a pair of coils in a single-layer DD configuration.
Figure 29:
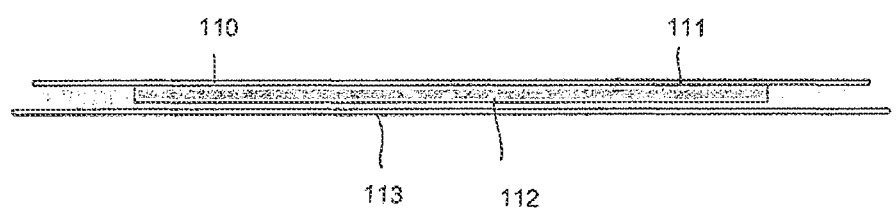

Referring first to FIG. 29, the apparatus comprises a pair of coils in an arrangement referred to herein as a single-layer double-D or DD configuration. The apparatus broadly comprises a pair of adjacent coils 110, 111 atop a magnetically-permeable core 112, which is in turn provided atop and spaced apart from an aluminium backplate 113. The core in the illustrated example comprises a plurality of elongate ferrite bars 112*a* parallel with an axis extending between the central poles of the coils 110, 111. The ferrite bars 112*a* may be made, at least in part, from a Manganese Zinc (Mn—Zn) ferrite material, for example.

The coils 110, 111 are each represented in the drawings by a rectangular area for clarity, but in practice preferably comprise substantially planar spiral windings of Litz wire, for example, substantially occupying the illustrated area. The windings may in practice be circular or elliptical, for example, rather than being precisely rectangular as suggested by the drawings.

Coils 110, 111 each have a central region 110a, 111a located between the pole areas; an end region 110b, 111b opposite the central region; and side regions 110c, 110d, 111c, 111d between respective ends of the central and end regions.

Figure 30:
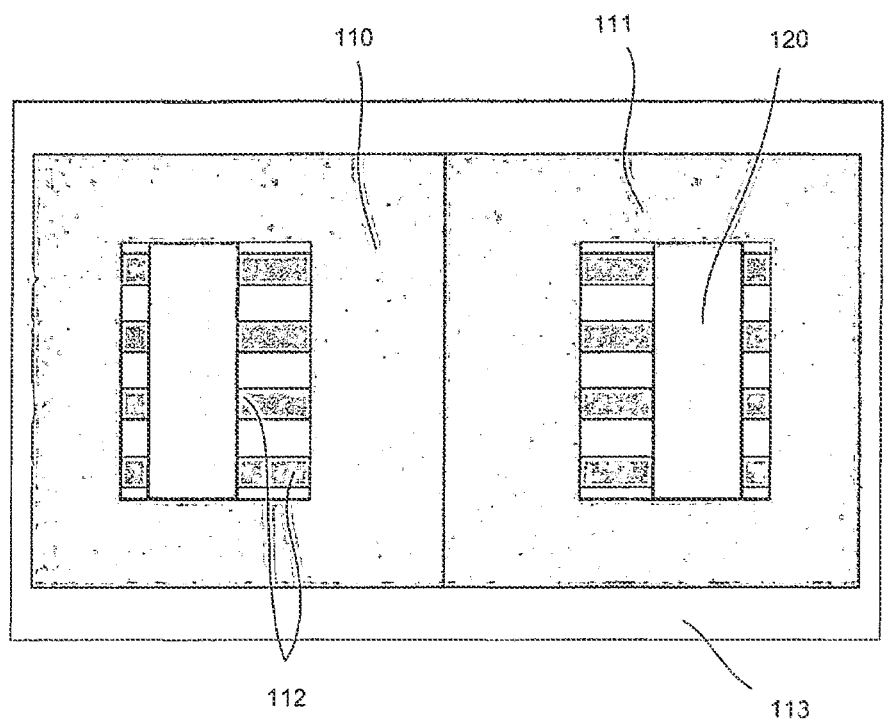
FIG. 30 provides (a) top; and (b) side views of another IPT flux-coupling apparatus according to the prior art, comprising a pair of coils in a single-layer DDQ configuration.
Figure 30:
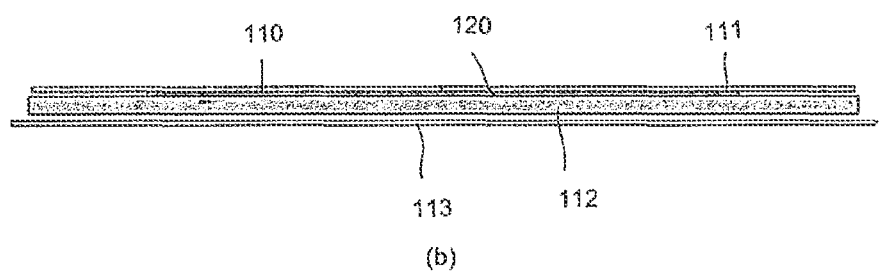

FIG. 30 illustrates a prior art variation of the apparatus of FIG. 29, in which a central "quadrature" coil is provided in addition to the adjacent pair of substantially D-shaped coils 110, 111, between the coils 110, 111 and the core 112 as shown. This pad configuration is thus termed a DDQ pad.

Referring to FIGS. 31(a) and 31(b), there is shown a first embodiment of an IPT apparatus according to the present invention, comprising a pair of coils in the DD configuration.

In this example embodiment, the core comprises a plurality of elongate ferrite bars 112a parallel with an axis extending between the central poles of the coils 110, 111, with the addition of a pair of transverse ferrite bars 112b at opposing ends thereof, parallel with the end regions 110b, 111b of the coils. The bars 112b provide auxiliary pole areas to absorb, direct or channel leakage flux. The core preferably extends beyond end regions 110b, 111b but not side regions 110c, 110d, 111c, 111d of the coils. More particularly, the transverse ferrite bars 112b are preferably provided entirely beyond, and more particularly directly adjacent, the outer edges of end regions 110b, 111b of the coils with the elongate ferrite bars 112b extending therebetween.

The transverse ferrite bars 112b at the end regions of the coils encourage magnetic flux to enter the core, and magnetic flux at each side region is encouraged by the elongate ferrite bars 112a to extend towards the pole area furthest from that side region.

According to the illustrated embodiment of the invention, the width of the opposing end regions 110b, 111b of the coils is reduced with respect to the central and side regions of the coils (and the end regions 110b, 111b of the prior art apparatus of FIG. 29) by dividing the adjacent windings of the respective end regions 110b, 111b between two or more layers. Thus while the windings of the central regions 110a, 111a and side regions 110c, 110d, 111c, 111d in this embodiment are preferably substantially planar, those of the end regions may be stacked in at least two substantially planar layers. The inductance of the coils remains the same as if the windings were all in a single plane, as the area enclosed by the coil remains identical.

It may be necessary to limit the width of the coils between the outer edge of end regions 110b, 111b due to limits on the length of the elongate ferrite bars 112a and/or to accommodate the transverse ferrite bars 112b beyond the outer edges of the coils, for example. The length of the elongate ferrite bars 112a may be determined by the availability of ferrite bars of certain dimensions and cost considerations or manufacturing difficulties in changing those dimensions, for example.

Depending upon the application of the IPT apparatus, it may be desirable for the top of the pad to be as flat as possible without any protrusions in the upper surface. For example, where the apparatus comprises a primary pad for charging a vehicle provided embedded within or atop a vehicle parking surface, any projections may present a tripping hazard and/or be exposed to damage. Accordingly, the additional layer of coil windings in the end regions 110b, 111b are preferably provided beneath the plane of the central regions 110a, 111a, side regions 110c, 110d, 111c, 111d, and the first layer of end regions 110b, 111b. The coils may be provided by winding a planar coil and folding the outer half of the end regions 110b, 111b beneath the inner half, for example.

Figure 31:
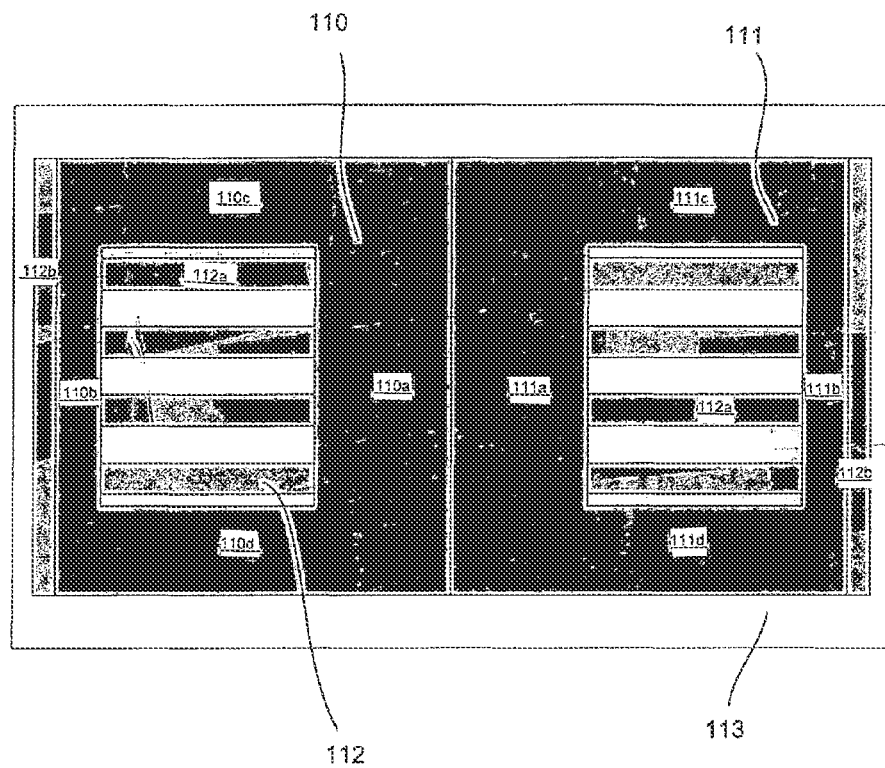
FIG. 31 provides (a) top; and (b) side views of a diagram of a first embodiment of an IPT flux coupling apparatus according to the present invention, with a double-layer DD coil configuration.
Figure 31:
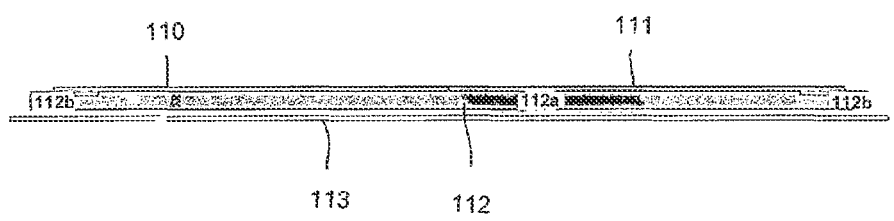

To accommodate the additional depth of coils 110, 111 in the end regions and ensure that the upper surface of the pad (on the side of the coils opposing the core and backplate) remains substantially flat, the core preferably comprises a recess, rebate or counterbore to receive the projecting second layer (and/or any additional layers) of the end regions 110b, 111b flush with the upper surface of at least part of the core. The substantially planar central regions 110a, 111a, side regions 110c, 110d, 111c, 111d, and the first layer of end regions 110b, 111b thus preferably lie in a single plane atop at least part of the core. In the embodiment of FIG. 31, the elongate ferrite bars 112a thus each comprise a recess or rabbet at opposing ends immediately adjacent the transverse bars 112b as shown in FIG. 3(b). It will also be seen from the same drawing that the transverse bars 112b form an outer lip or projecting end edge extending upwardly and at least partially overlapping the coils (i.e. the second layer of the end regions 110b, 111b in this embodiment) which may provide additional advantages as described in further detail below.

Figure 32:
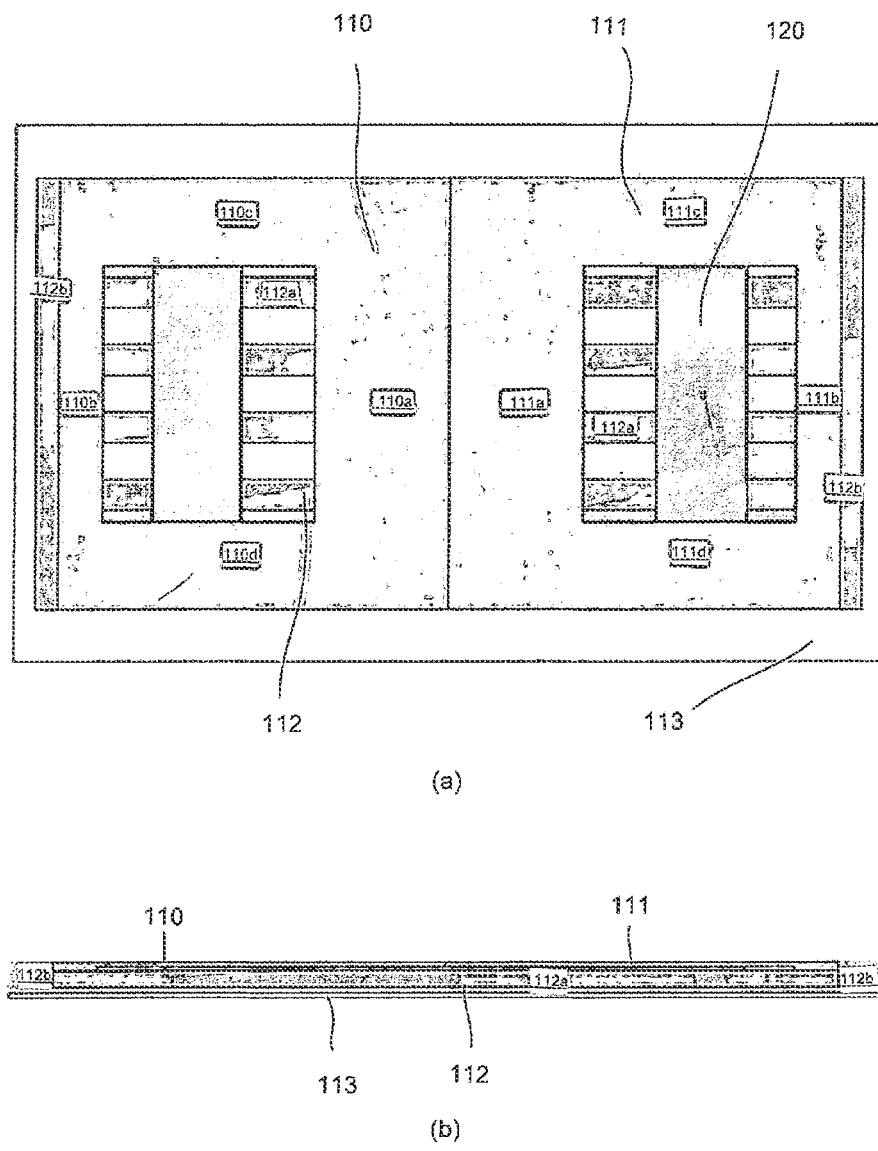
FIG. 32 provides (a) top; and (b) side views of a diagram of a second embodiment of an IPT flux coupling apparatus according to the present invention, with a double-layer DDQ coil configuration.

FIG. 32 illustrates a variation of the apparatus of FIG. 31, in which a central "quadrature" coil is provided in addition to the adjacent pair of substantially D-shaped coils 110, 111. This pad configuration is thus termed a DDQ pad.

According to the embodiment of the DDQ pad illustrated in FIG. 32, As in the apparatus of claim 1, the end regions 110b, 111b of the coils are stacked in two layers of windings to reduce the overall width of the apparatus between transverse bars 112b. However, unlike the embodiment of FIG. 31, coils 110, 111 are not partially recessed in core 112. Instead, the second layer of coil windings in the end regions 110b, 111b provide a space for provision of the quadrature coil between DD coils 110, 111, and the core 112 as shown in FIG. 32(b). That is, the quadrature coil is substantially planar with the second layer of end regions 10b, 11b beneath the substantially planar central regions 10a, 11a, side regions 10c, 10d, 11c, 11d, and the first layer of end regions 110b, 111b of DD coils 110, 111.

Figure 33:
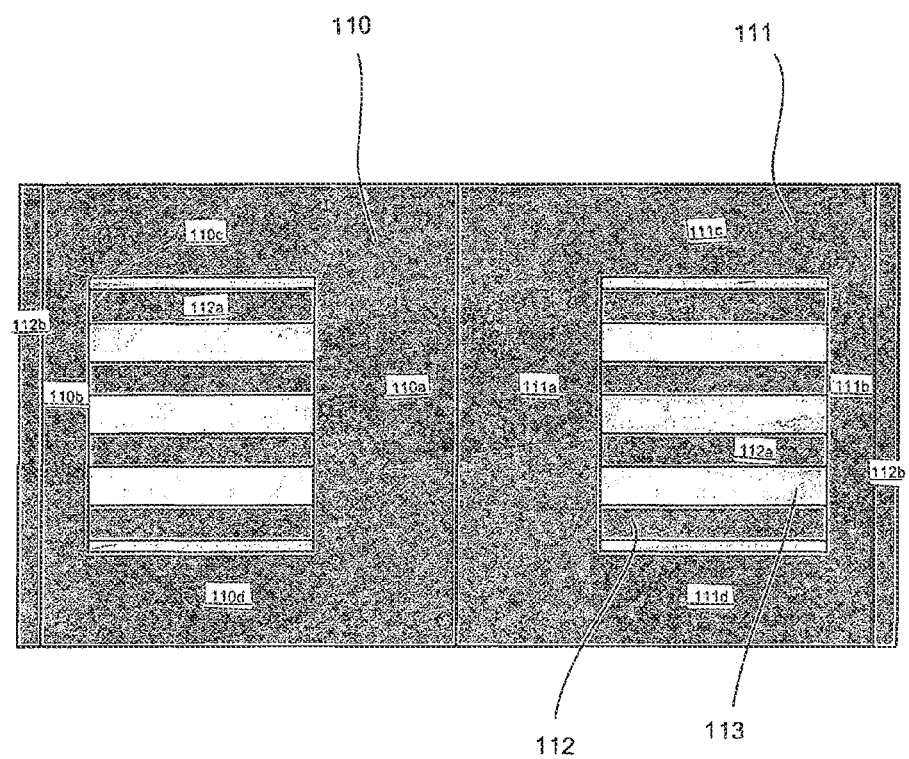
FIG. 33 provides (a) top; and (b) side views of a diagram of a third embodiment of an IPT flux coupling apparatus according to the present invention, with a double-layer DD coil configuration.
Figure 33:
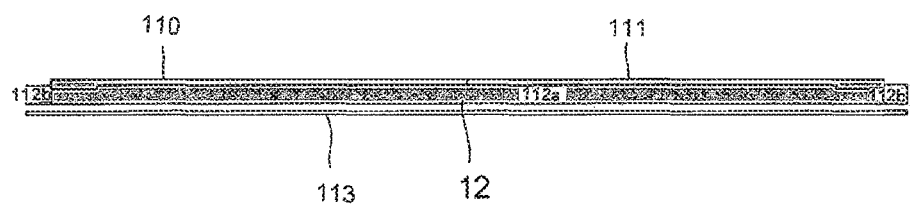
Figure 34:
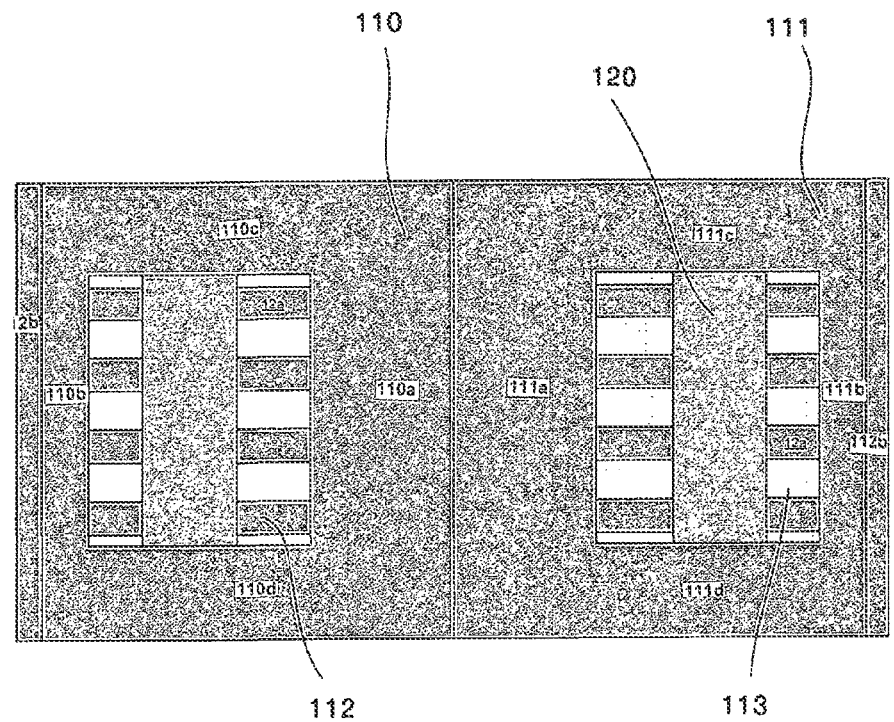
FIG. 34 provides (a) top; and (b) side views of a diagram of a fourth embodiment of an IPT flux coupling apparatus according to the present invention, with a double-layer DDQ coil configuration.
Figure 34:
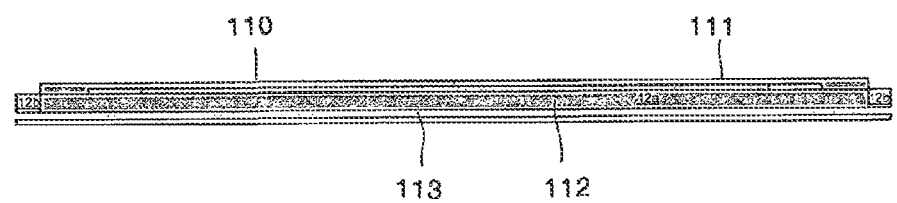

FIGS. 33 and 34 illustrate further embodiments of the DD and DDQ pads of FIGS. 29 and 32, respectively, in which the size of the backplate 113 is reduced.

In many applications of wireless power transfer, magnetic flux need only be produced to, or received from, one axial side of the energised coil(s). For vehicle charging, for example, the primary coils will generally be provided on or in the ground, and a vehicle with a secondary flux coupling apparatus will be parked only above the primary coils for magnetic coupling therewith. The backplate 113 of the primary pad is thus generally made from a sheet of a substantially non-magnetic material such as aluminium provided beneath the coils so that the apparatus provides only a single-sided field directed upwards towards the secondary flux coupling apparatus. Similarly, the secondary flux-coupling apparatus may be provided with a backplate to ameliorate magnetic flux passing beyond the apparatus.

To substantially shield the opposite side of the coils from magnetic flux the backplate 113 according to flux coupling apparatuses of the prior art has generally extended beyond the coils and the core to provide an extended area of shielding. However, it has been discovered that doing so results in eddy currents in the back-plate which induce a magnetic field and may generate excess heat.

Accordingly, in various embodiments of the present invention, the backplate 113 extends no further than the outer edges of the coils 110, 111, 120 and/or core 112, and in at least some embodiments the backplate 113 may recessed or set back from of an outer perimeter defined by the coils and/or core to reduce leakage flux indirectly caused by eddy currents induced in the backplate. More particularly, the backplate preferably extends no further than the outer edge of the core at the ends of the apparatus, whereby the backplate is essentially shielded by the core. In the illustrated embodiments of FIGS. 33 and 34, for example, the backplate 113 comprises a rectangular sheet of substantially non-magnetic material which extends only to the outer edges of the transverse bars 112b in one direction, and the outer edges of side regions 110c, 110d, 111c, 111d of coils 110, 111, 120 in the other direction.

Reducing the size of the backplate 113 reduces leakage flux indirectly caused by eddy currents by encouraging flux to enter the core 112 rather than the backplate. However, in certain applications the larger backplate 113 of the prior art may be preferred for shielding reasons, for example.

Figure 35:
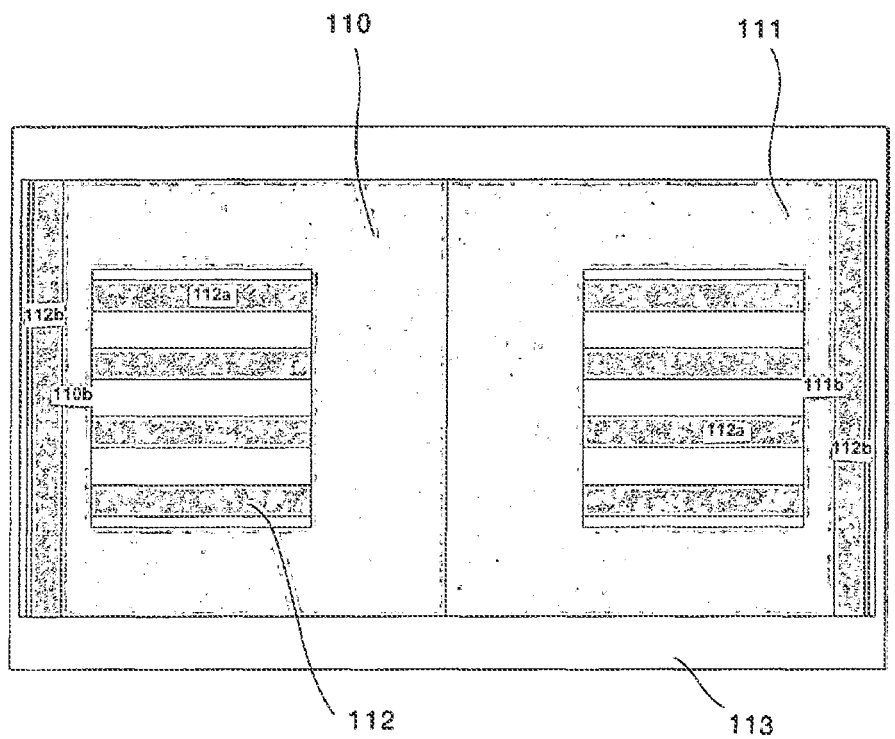
FIG. 35 provides (a) top; and (b) side views of a diagram of a fifth embodiment of an IPT flux coupling apparatus according to the present invention, with a triple-layer DD coil configuration.
Figure 35:
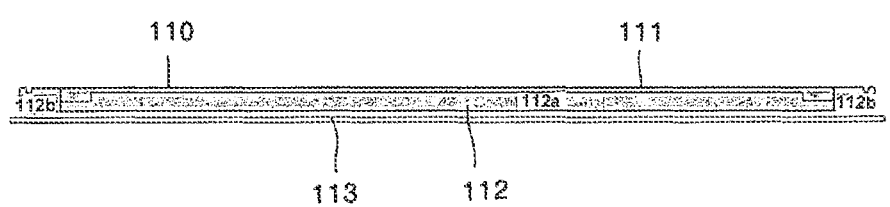
Figure 36:
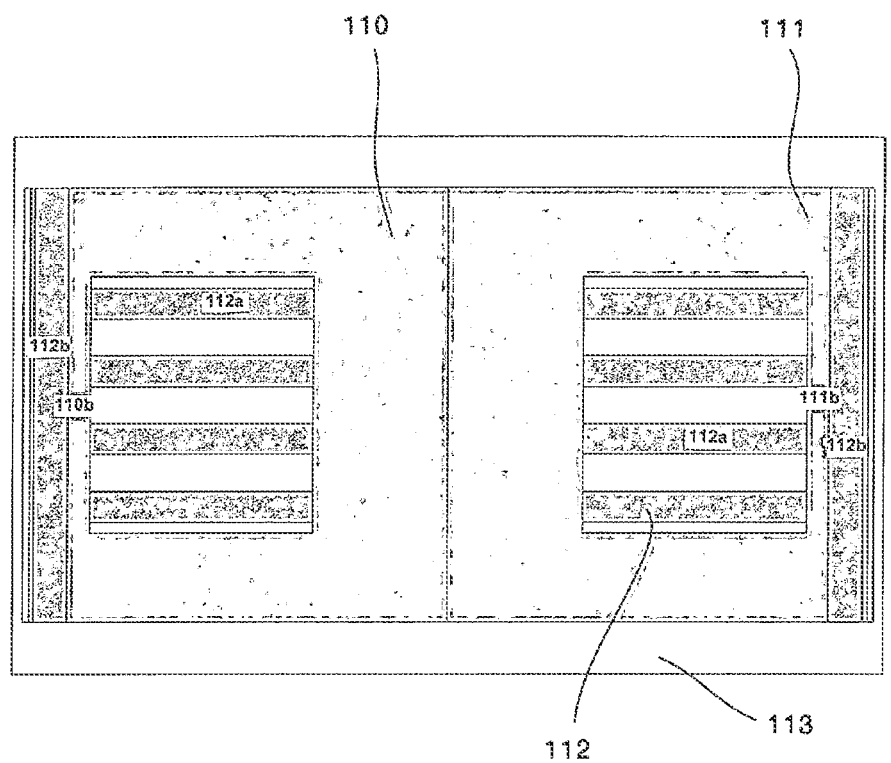
FIG. 36 provides (a) top; and (b) side views of a diagram of a sixth embodiment of an IPT flux coupling apparatus according to the present invention, with a quadruple-layer DD coil configuration.
Figure 36:
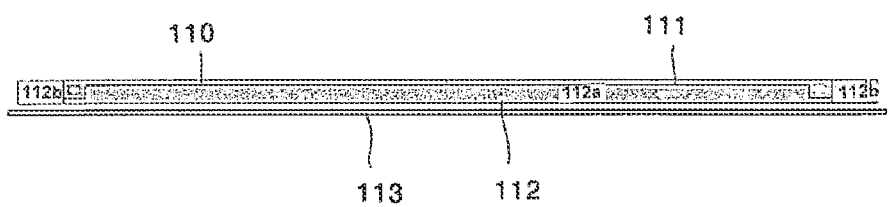

FIGS. 35 and 36 illustrate further variations of the DD embodiment of FIG. 31, in which the opposing end regions 110b, 111b of the coils are further reduced with respect to the central and side regions of the coils by dividing the adjacent windings of the respective end regions 110b, 111b between three and four layers, respectively, stacked on top of each other. This has the added benefit of enabling wider transverse ferrite bars 112b without increasing the overall size of the pad, further reducing flux leakage by due to lower reluctance.

An important consideration in the design of flux coupling apparatuses having multiple layers of windings in the end regions 110b, 111b recessed into the core is that the height and cross-sectional area of the core in the recessed region is correspondingly reduced. The efficiency of the design may be compromised if the recessed area(s) of the core saturates in use, in which case the core may not provide a sufficiently low reluctance path for magnetic flux. Considering the BH characteristics of Mn—Zn ferrite, for example, anything below 0.3 T in flux density can be regarded as unsaturated, and testing of the quadruple-layer apparatus of FIG. 36 revealed a maximum flux density of 0.267 T, for example.

In both illustrated embodiments the height of the transverse ferrite bars 112b is also increased with respect to the embodiment of FIG. 31. The height of the transverse bars 112b in these embodiments is therefore greater than that of the elongate ferrite bars 112a, whereby the transverse bars 112b each form a lip at opposing ends of the core. More particularly, as shown in FIGS. 35(b) and 36(b) the transverse bars 112b are preferably sized so that their top surfaces lie substantially flush with the top surface of coils 110, 111 when recessed as described above. This has the effect of further reducing leakage flux by directing much of it through the transverse ferrite bars 112b. That is, the lip of the core at opposing ends of the apparatus stops or at least ameliorates leakage from the end windings of coils 110, 111.

Figure 37:
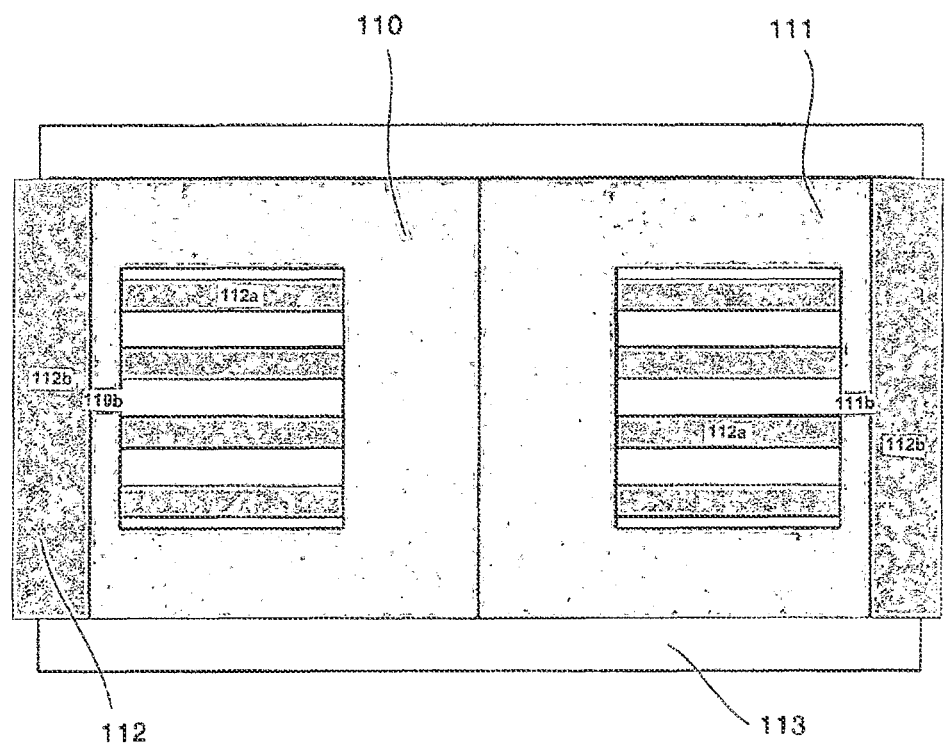
FIG. 37 provides (a) top; and (b) side views of a diagram of a seventh embodiment of an IPT flux coupling apparatus according to the present invention, with a triple-layer DD coil configuration.
Figure 37:
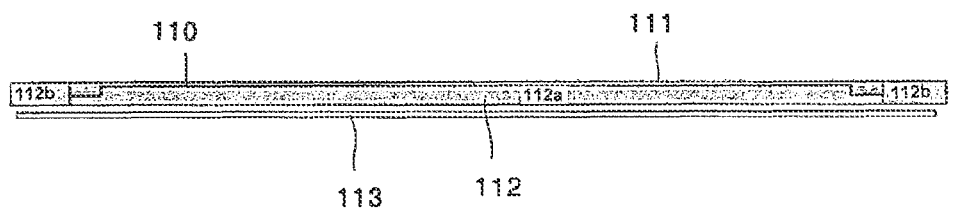

FIG. 37 illustrates a further, preferred, embodiment of an IPT apparatus according to the present invention, combining several of the features describe above. In particular, the apparatus comprises a pair of DD coils having a triple-layer of windings in the end regions 110b, 111b recessed into the elongate ferrite bars 112a of the core; transverse ferrite bars 112b which are wider again that those of FIGS. 35 and 36 and provide a lip at opposing ends of the core which sit flush, or above, the top surface of coils 110, 111; and a backplate 113 which extends beyond the side regions 110c, 110d, 111c, 111d of the coils, but shorter in overall length than the core 112 whereby the opposing edges of the backplate fall between the outer edges of end regions 110b, 111b of the core and the outer edges of the transverse ferrite bars 112b.

As can be seen from the foregoing, the height or depth of the coil at opposing ends of the core can be considered as having a centre of current i.e. a central point from which the field produced by the coil emanates. If the auxiliary pole area (whether formed by a wall portion, lip, bar or otherwise) is provided at or above the centre of current then the leakage flux generated by the coil that would otherwise manifest itself as leakage flux will tend to be directed, channeled or absorbed at the auxiliary pole face. In the examples illustrated the recess is shown facing toward the region in which coupling flux is directed or received. However is other embodiments the recess may face toward the centre of the coil i.e. the auxiliary pole area may cover an peripheral edge of the coil to which it is adjacent.

Figure 46:
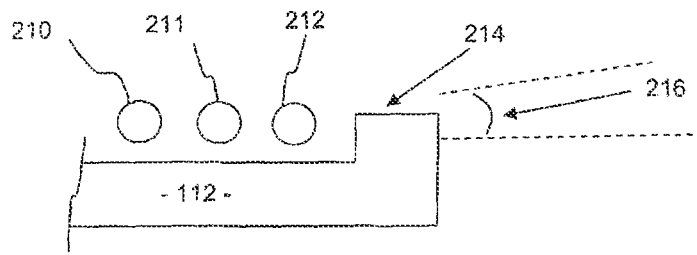
FIGS. 46-50 show partial side elevations in cross section of an end or peripheral region of further embodiments of magnetic flux coupling devices.

For example, FIG. 46 shows a partial diagrammatic cross section of an end or peripheral region of a coil, such as, without limitation, a coil 110 or 111 of the preceding embodiments. Individual turns 210-212 of the coil are shown adjacent to a magnetically permeable member such as (again without limitation) a core 112. The group of turns 210-212 in the end or peripheral region represent a flux generator having a centre of current at or near to central turn 211. The auxiliary pole area 214 is provided above the centre of current, at an angle 216 which is greater than zero.

Figure 47:
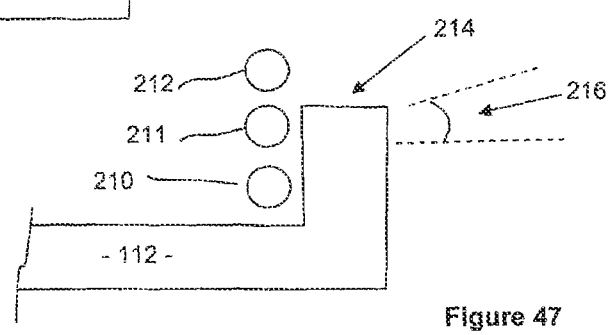

Another example is shown in FIG. 47 which uses like reference numerals to refer to like features described above with reference to FIG. 46. Although the group of turns extend above the height of the pole area 214, the pole area 214 is at an angle 216 relative to the centre of current which is in the vicinity of turn 211.

Figure 48:
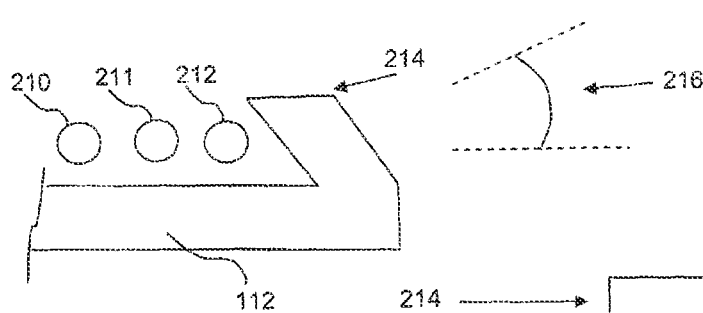
Figure 49:
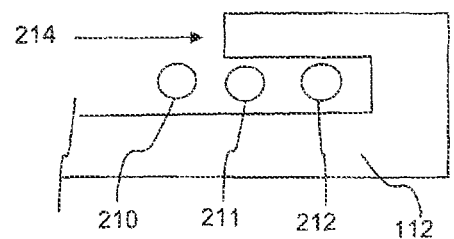

Two further examples are shown in FIGS. 48 and 49. Referring to FIG. 48, the auxiliary pole area is provided as part of an angled lip beyond the coil end or periphery region. In FIG. 49 a recess is provided which faces toward the centre of the coil.

Figure 50:
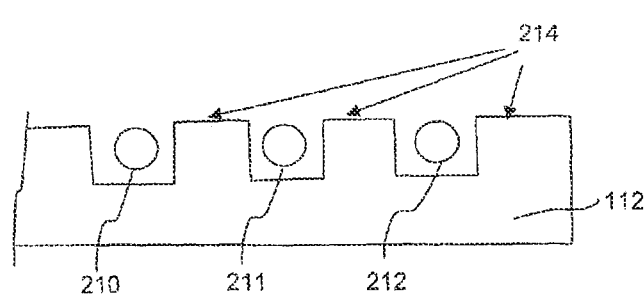

In the embodiment shown in FIG. 50, the auxiliary pole area is in effect distributed so that it comprises a plurality of pole areas, being formed from a plurality of pieces of magnetically permeable material located between turns (or groups of turns) at or near the coil peripheral region.

Referring to FIG. 37(a), this example embodiment of the invention preferably has a backplate 113 measuring 775×485×4 mm (length×width×depth); the core 112 preferably has overall measurements of 826×391×20 mm, comprising a pair of transverse ferrite bars measuring 391×70×20 mm and a plurality of elongate ferrite bars measuring 686×28×16 mm extending therebetween and spaced apart from each other by 33 mm; and a pair of adjacent coils 110, 111 each having outer dimensions measuring 391×343 mm, including central regions 110a, 111a of 120 mm in width, end regions 110b, 111b of 28 mm width, and side regions 110c, 110d, 111c, 111d of 80 mm width.

With particular reference to FIG. 37(b), each planar layer of the coils 10, 11 of the illustrated embodiment is approximately 4 mm deep, for a total depth of 12 mm in the triple-layer end regions 110b, 111b. This requires an 8 mm recess in the 16 mm deep elongate ferrite bars 112a to accommodate the second and third layers of the coils. The transverse ferrite bars 112b in this embodiment thus preferably have a depth of 20 mm to sit flush with the coils 110, 111. The core 112 is preferably spaced 6 mm from the backplate 113, which is 4 mm thick. It can also be seen in this diagram that the opposing edges of the backplate 113 in the lengthwise direction are recessed or set back from the outer edges of transverse ferrite bars 112b to reduce leakage flux indirectly caused by eddy currents induced in the backplate.

The above dimensions are provided by way of example only, and are not to be construed as being in any way limiting of the dimensions or relative proportions of components of the apparatus according to the present invention. The shape, scale and relative dimensions of components may be varied within reason, without departing from the scope of the invention.

FIGS. 38(a) and (b) show a construction having a "quadrature" coil, in general accordance with that described with respect to FIG. 32, however end bars 112b which provide auxiliary pole areas are larger. The auxiliary pole areas in this embodiment and the FIG. 32 and FIG. 34 embodiments can not only reduce leakage fluxes from the 110 and 111, but can also assist with providing a pathway for coupling flux to or from the quadrature coil 120. In this embodiment the bars 112b are 30 mm wide and 16 mm deep, and the overall dimensions of the structure are 775 mm along the y axis and 485 mm along the x axis.

FIG. 38(c) shows a secondary pad 200 misaligned with a primary pad 201 by a distance 202 (of 200 mm) along the x axis, which is the misalignment referred to below in connection with the contour plots of FIGS. 39 and 40.

Figure 39:
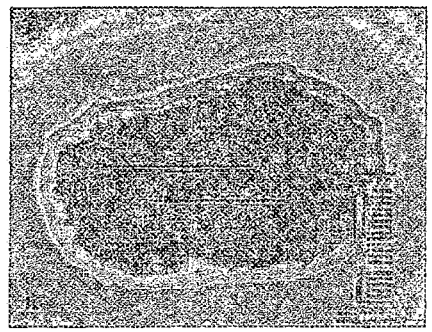
Figure 39:
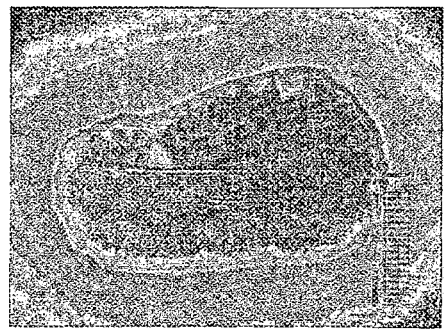
Figure 39:
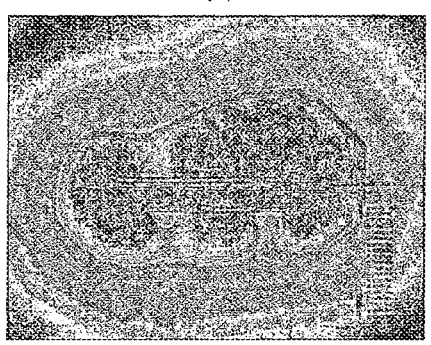
Figure 39:
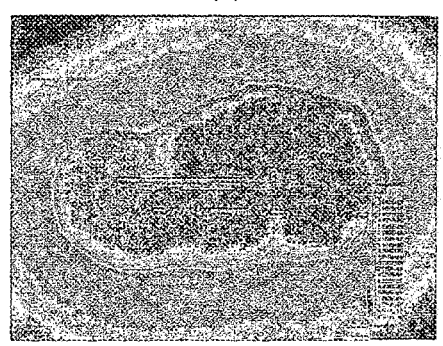

FIG. 39 illustrates in four contour plots the simulated flux leakage of four different primary and secondary pad combinations, with a horizontal displacement of 200 mm along an x-axis parallel with a line between the poles of each of the pads—a decidedly sub-optimal alignment to demonstrate the near-worst-case flux leakage. The vertical or z-axis displacement between the primary and secondary pads was fixed at a 125 mm air gap between the respective surfaces of the pads. The scale used for the contour plots range from 0 to 16.9 µT, where 16.9 µT is the magnetic field which should not be exceeded to prevent issues with artificial cardiac pacemakers. The primary pad was energised and the secondary pad left open circuit to evaluate changes in the leakage profile. In FIGS. 39-42, the pads are seen as horizontal lines near the centre of each plot.

For comparison, FIG. 39(a) shows the leakage flux for the prior art DD primary pad of FIG. 29 inductively coupled with the prior art DDQ secondary pad of FIG. 30. That is, neither pad comprises the transverse ferrite bars 112b, recessed coils 110, 111, or reduced backplate 113 of various embodiments of the present invention. FIG. 39(b) illustrates the leakage flux for a primary pad according to the double-layer DD embodiment of FIG. 31 inductively coupled with a double-layer DDQ secondary pad according to the embodiment of FIG. 32. FIG. 39(c) illustrates the leakage flux for a primary pad according to the double-layer DD embodiment of FIG. 33 inductively coupled with a double-layer DDQ secondary pad according to the embodiment of FIG. 34. FIG. 39(d) illustrates the leakage flux for a primary pad according to the quadruple-layer DD embodiment of FIG. 36 inductively coupled with a double-layer DDQ secondary pad substantially as illustrated in FIG. 32, but with wider transverse ferrite bars 112b.

It can be seen from the diagrams of FIG. 39 that each of the pad combinations of FIGS. 39(b)-39(d) result in an improvement in flux leakage with respect to the immediately preceding diagram. At 800 mm directly behind the centre of the secondary pad, the magnetic flux of FIG. 39(b) is 61.6 µT—a reduction of 23.1% over the magnetic flux of 80.1 µT for FIG. 39(a), for example. For the embodiment of FIG. 39(c) the magnetic flux is 54.8 µT—a reduction of 31.6%.

Figure 40:
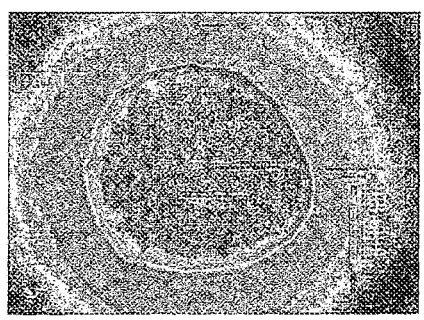
FIG. 40 provides (a) end; and (b) side views of flux leakage for a magnetic coupling between single-layer DD primary and DDQ secondary pads of the prior art, with a horizontal displacement therebetween along a y-axis.
Figure 40:
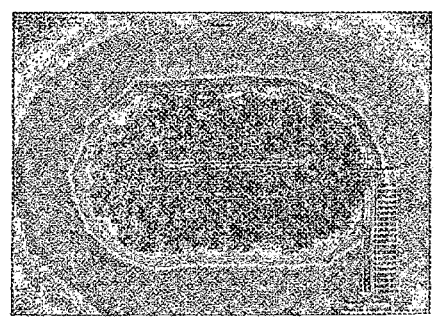
Figure 41:
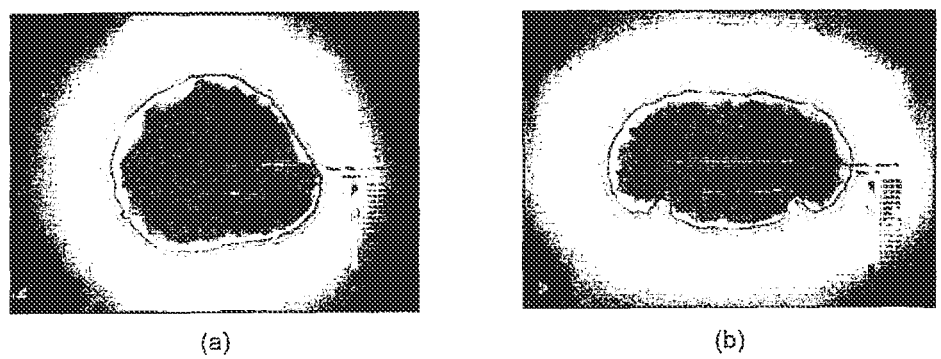
FIG. 41 provides (a) end; and (b) side views of flux leakage for a magnetic coupling between a primary pad according to the first embodiment and a secondary pad according to the second embodiment of the invention, with a horizontal displacement therebetween along a y-axis.
Figure 42:
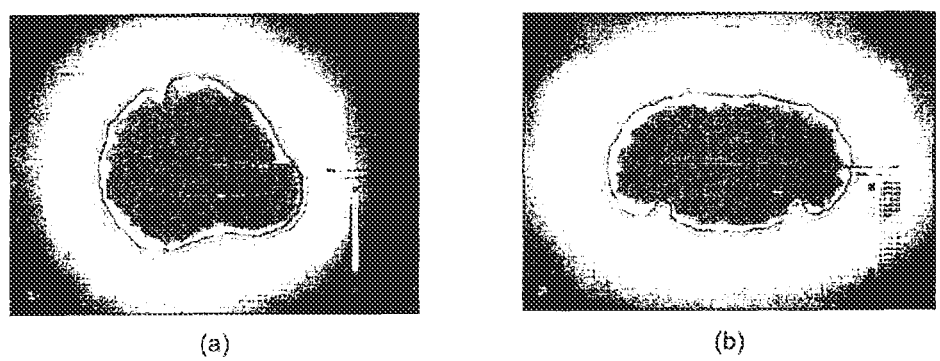
FIG. 42 provides (a) end; and (b) side views of flux leakage for a magnetic coupling between a primary pad according to the seventh embodiment and a secondary pad similar to the second embodiment, with a horizontal displacement therebetween along a y-axis.

FIGS. 40-42 illustrate in six contour plots the simulated flux leakage of three different primary and secondary pad combinations, with a horizontal displacement of 200 mm along a horizontal y-axis (and no displacement in the x-axis). For each of the three different primary and secondary pad combinations, there is shown (a) a cross section in plane with the y-axis; and (b) a cross section in plane with the x-axis.

Referring first to FIG. 40, magnetic flux leakage is shown for the same primary and secondary pads of FIGS. 29 and 30, as used in FIG. 39(a).

FIG. 41 shows the flux leakage for the same primary and secondary pads as used in FIG. 39(b). That is, a double-layer primary pad according to the DD embodiment of FIG. 31 inductively coupled with a double-layer DDQ secondary pad according to the embodiment of FIG. 32.

Figure 38:
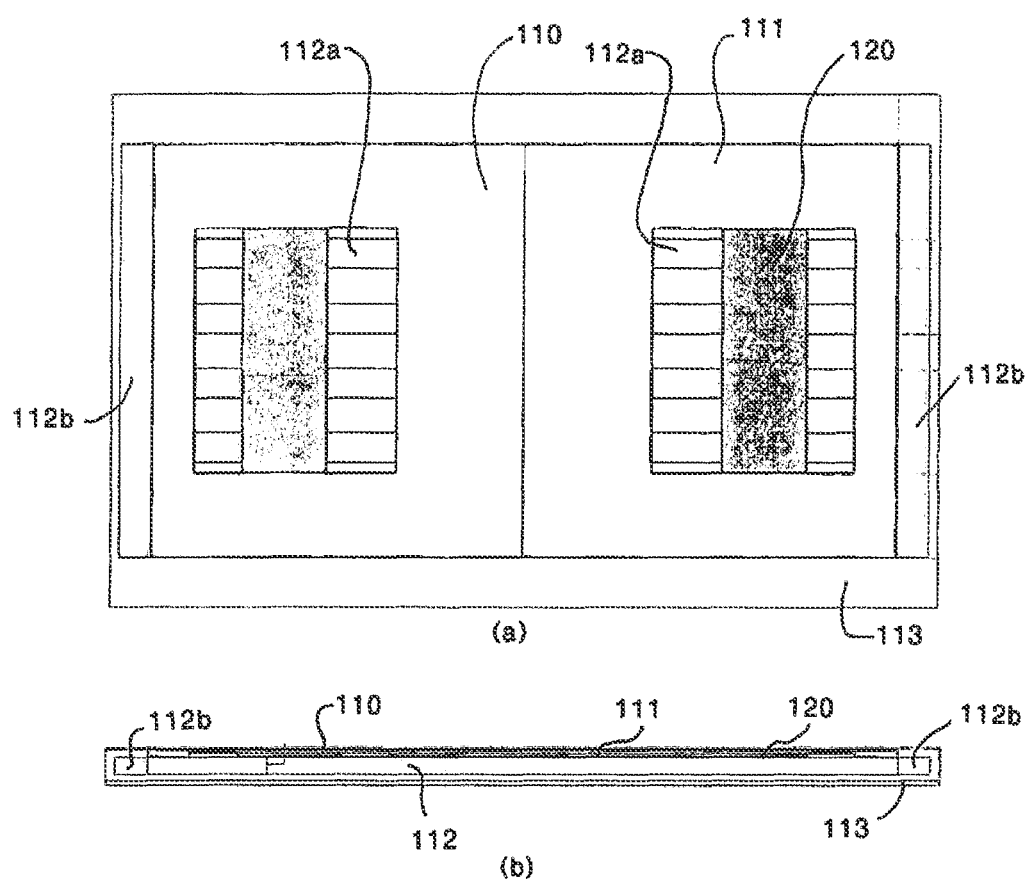
FIG. 38 provides (a) top and (b) side views of an embodiment with a DDQ coil configuration, and (c) a diagrammatic side elevation of primary and secondary pad structures misaligned along the x-axis.
Figure 38:
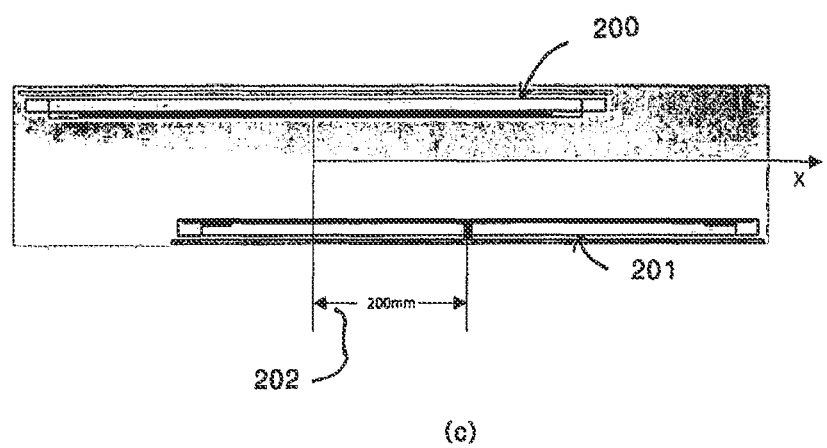

FIG. 42 shows the flux leakage for a primary pad according to the triple-layer embodiment of FIG. 37, and a secondary pad according to FIG. 38.

Figure 43:
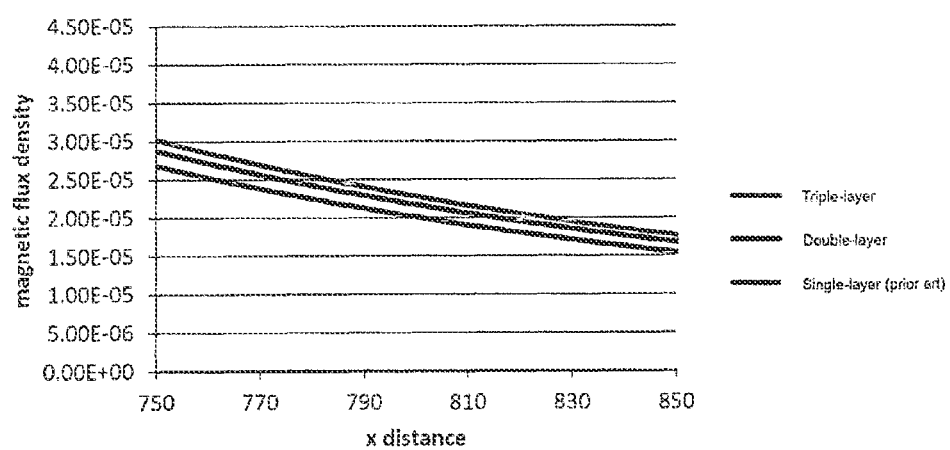
FIG. 43 is a graph of the magnetic flux density at various distances for each of the three configurations of FIGS. 11-13.

Again, it can be seen that the two embodiments of the present invention, as shown in FIGS. 41 and 42, display improved flux leakage with respect to FIG. 40. These improvements are shown in the graph of FIG. 43 which shows a comparison of the magnetic flux density at various distances from the centre for each of the three configurations. As can be seen, the triple layer embodiment of FIG. 42 (representing the lowermost locus in FIG. 43) has the lowest flux density (i.e. the lowest field leakage) remote from the coupled pads.

Figure 44:
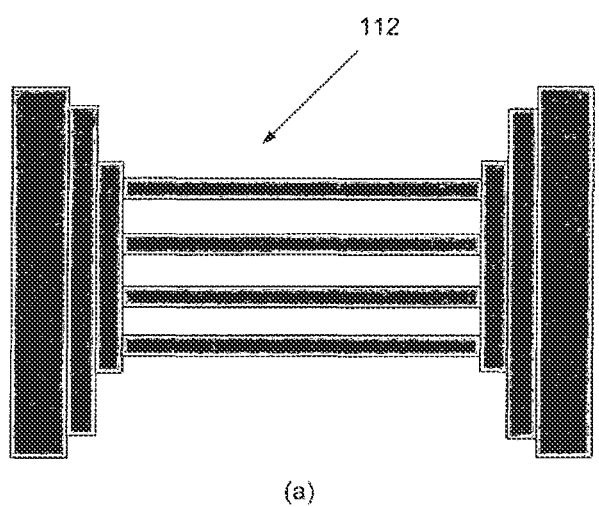
FIG. 44 shows (a) top; and (b) side views of an approximation of the core of FIG. 9 using a plurality of ferrite bars each having one of three predefined dimensions.
Figure 44:
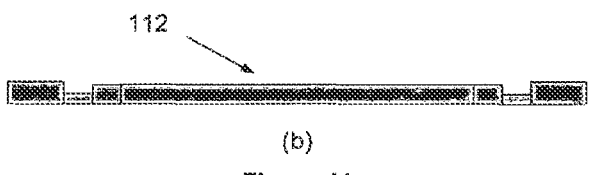

In practice, the design of the core arrangement may be dictated to at least some degree by the availability and/or cost of ferrite bars of the required overall dimensions. For example, only ferrite bars having the standard measurements of 116×35×10 mm (length×width×depth), 109×15×8 mm, and 93×28×16 mm may be available and/or economic. The core of FIG. 37 can be approximated using ferrite bars of these dimensions as shown in FIG. 44, for example, wherein each of the illustrated regions of the core comprises a plurality of ferrite bars in one of the above dimensions.

Figure 45:
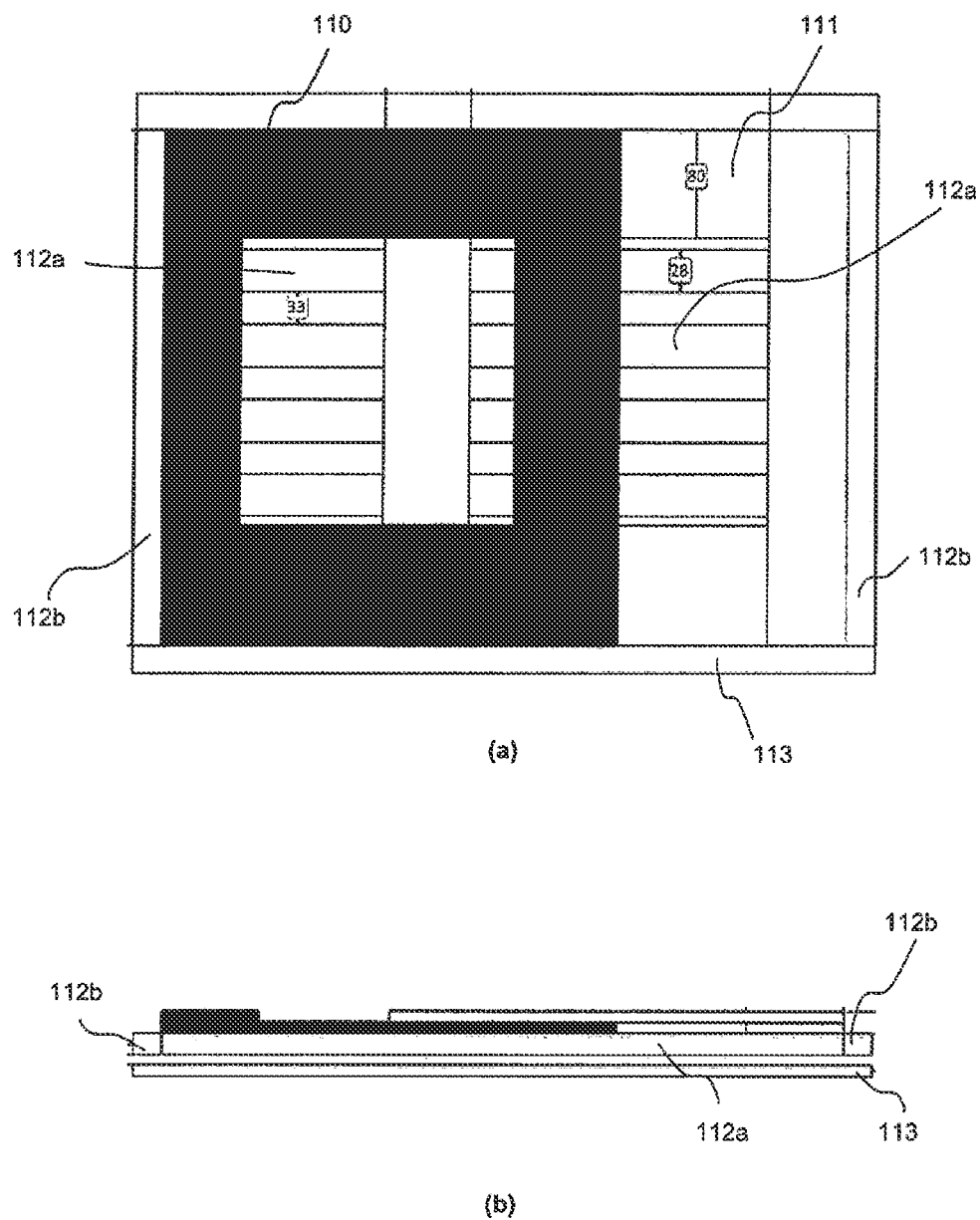
FIG. 45 provides (a) top and (b) side views of a magnetic coupler in the form of a bipolar pad (BPP) coil arrangement.

Furthermore, another magnetic flux coupling construction that can be used as a primary or secondary pad is shown in FIG. 45. This construction is very similar to that described earlier with respect to FIG. 28. In this embodiment the overlapping coils 110 and 111 are stacked (i.e. have turns layered one above the other) at the ends of the coils near ferrite sections 112b. This is best seen in FIG. 45(b). Again, sections 112b provide auxiliary pole areas which function as described above. This structure can be used as a primary pad or a secondary pad, and as with other embodiments described, sections 112b may be raised to a level at or above the height of the stacked coils, and/or may be recessed.

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

In particular, while the example embodiments of the invention described herein have a core comprising a plurality of elongate ferrite bars, the invention is not limited thereto and may instead comprise a non-ferrous magnetically-permeable material and/or a substantially planar sheet of magnetically permeable material, for example. The sheet may be substantially thinner than the elongate ferrite bars, resulting in a low-profile flux-coupling apparatus which may be preferred for this reason in at least some applications. The sheet core may also comprise transverse bars in the form of projecting regions at each end of the core adjacent the end regions of the coils 10b, 11b, and those regions may similarly be said to provide a lip in the core.

In some embodiments, coils 10, 11 may comprise a plurality of layers about their full circumference rather than merely the end regions 10b, 11b. However, the end regions preferably comprise at least one additional layer recessed into the core to reduce the width of the end regions 10b, 11b with respect to the other regions of the coils to allow for the transverse ferrite bars 12b. While the windings of each of the coils are preferably divided equally among the plurality of layers and stacked directly atop each other, these features are not essential to the invention and one or more of the layers may, in other embodiments, each comprise a different number of windings and/or be offset or staggered with respect to at least one adjacent layer of windings.

Various embodiments of the invention may also be provided with a cover to protect the coils, core, and/or backplate from damage due to impact, debris, or shorting, for example. The cover may abut the transverse ferrite bars 12b and project upwards therefrom and across the coils to the opposing side. The cover is preferably substantially composed of a non-magnetic material such as plastic so as not to interfere with the transfer of power, but in at least some embodiments may comprise a magnetically-permeable material at or adjacent the core to further ameliorate flux leakage to the sides and/or behind the apparatus, directing it towards the core 12.

In various embodiments of the present invention, the lip of the core extends upwardly beyond the recess in the core which receives at least one layer of coils 10, 11; to the upper surface of the coils 10, 11 to sit flush therewith; or project beyond the upper surface of the coils to further encourage flux to enter the core.

Furthermore, the present invention is not limited to applications comprising DD or DDQ coil configurations as depicted herein, and may also have application in any other coil configuration including at least bi-polar pad (BPP) configurations comprising a pair of overlapping coils.

From the foregoing it will be seen that a flux-coupling IPT apparatus is provided which enables the wireless transfer of power with reduced levels of flux leakage to the sides and/or behind the primary and/or secondary pad.

Unless the context clearly requires otherwise, throughout the description, the words "include", "comprise", "comprising", and the like, are to be construed in an inclusive sense as opposed to an exclusive or exhaustive sense, that is to say, in the sense of "including, but not limited to".

Any discussion of the prior art throughout the specification should in no way be considered as an admission that such prior art is widely known or forms part of common general knowledge in the field.

The invention claimed is:

1. A device comprising:
a magnetically permeable core with a first side;
two coils disposed on and substantially coplanar with the first side of the magnetically permeable core;
wherein:
the two coils each define a pole area;
the pole areas of the two coils are spaced along a first axis of the magnetically permeable core;
the magnetically permeable core defines two auxiliary pole areas;
the pole areas of the two coils are disposed between the two auxiliary pole areas;
the two auxiliary pole areas are configured to capture leakage flux that escapes the pole areas of the two coils; and
the first side of the magnetically permeable core is narrower in a central region, between the two auxiliary pole areas, than at the ends of the magnetically permeable core next to the two auxiliary pole areas.

2. The device of claim 1, wherein the two auxiliary pole areas are disposed at opposing ends of the magnetically permeable core immediately adjacent to an edge of the coils.

3. The device of claim 1, wherein the two auxiliary pole areas comprises transverse sections of the core, and the transverse sections of the core that comprises the auxiliary pole areas extend further in a direction orthogonal to the first axis of the magnetically permeable core than another section of the core that is located between the auxiliary pole areas.

4. The device of claim 1, wherein the central region of the magnetically permeable core does not extend past the edges of the coils in a direction orthogonal to the first axis.

5. The device of claim 1, wherein the device comprises a back plate, and the back plate is wider than the central region of the magnetically permeable in a direction orthogonal to the first axis.

6. A magnetic flux coupler comprising:
a magnetically permeable core with a first side having a length direction and a width direction, wherein the core is narrower, in the width direction, in a central region, that is located between opposing longitudinal ends of the core, than at the opposing longitudinal ends of the core; and two coils disposed side by side on and substantially coplanar with the first side of the core, each of the two coils has a nominal centre, and the nominal centers of the two coils are space along the length direction of the core.

7. The magnetic flux coupler of claim 6, wherein the central region is disposed equidistant between opposing the ends of the length direction.

8. The magnetic flux coupler of claim 6, wherein the first side of the core is substantially planar.

9. The magnetic flux coupler of claim 6, wherein the two coils are aligned along a longitudinal axis that extends in the length direction.

10. The magnetic flux coupler of claim 6, wherein the magnetic flux coupler is symmetric about a transverse axis that extends in the width direction.

11. The magnetic flux coupler of claim 6, wherein the magnetic flux coupler comprises a shield, the shield is disposed on a second side of the core, the second side of the core is opposite the first side of the core, and the shield is wider than the central region of the core in the width direction.

12. The magnetic flux coupler of claim 6, wherein the magnetically permeable core extends past the end of the coils in the length direction.

13. The magnetic flux coupler of claim 6, wherein the magnetically permeable core does not extends past the end of the coils in the width direction.

14. A magnetic flux coupler comprising:
a magnetically permeable core with a first side;

two coils disposed side by side on and substantially coplanar with the first side of the magnetically permeable core;

wherein:

the first side of the magnetically permeable core has an approximate I-shape that is narrower in a central region between the two coils than at the ends of the magnetically permeable core outside the two coils.

15. The magnetic flux coupler of claim 14, wherein the magnetically permeable core comprises means for capturing leakage flux.

16. The magnetic flux coupler of claim 14, wherein the magnetically permeable core consists of ferrites.

17. The magnetic flux coupler of claim 14, wherein the magnetic flux coupler comprises a back plate, and the back plate is wider than the magnetically permeable core in a central region of the approximate I-shape.

18. The magnetic flux coupler of claim 14, wherein the first side is substantially planar, and the two coils are substantially flat.

* * * * *